United States Patent [19]

Moricca et al.

[11] 4,142,181

[45] Feb. 27, 1979

[54] SCANNING SYSTEM AND METHOD USING COINCIDENCE OF VARIABLE FREQUENCY PULSES

[75] Inventors: Anthony C. Moricca, 3629 Aboite Lake Rd., Fort Wayne, Ind. 46804; Dwight S. Humphreys, Fort Wayne, Ind.

[73] Assignee: Anthony C. Moricca, Fort Wayne, Ind.

[21] Appl. No.: 789,985

[22] Filed: Apr. 22, 1977

[51] Int. Cl.² .............................................. G06F 3/14
[52] U.S. Cl. .................................. 340/781; 358/240; 340/805; 340/803
[58] Field of Search ..................................... 340/324 R, 340/324 M, 168 S; 358/240

[56] References Cited

U.S. PATENT DOCUMENTS

| | | | |
|---|---|---|---|
| 3,541,542 | 11/1970 | Duguay | 340/324 R |
| 3,634,849 | 1/1972 | Nishizawa et al. | 340/324 R |
| 3,665,455 | 5/1972 | Schmersal et al. | 340/324 M |
| 3,668,688 | 6/1972 | Schmersal | 340/324 M |

Primary Examiner—Marshall M. Curtis
Attorney, Agent, or Firm—Gust, Irish, Jeffers & Rickert

[57] ABSTRACT

A system for information display, such as for television, employing a panel assembly having electroluminescent properties. First and second elongated conductors are provided on opposite sides of an electroluminescent substrate, both being spaced from a ground plate conductor to define first and second transmission lines therewith. Each conductor is folded upon itself a plurality of times to define spaced, parallel, straight leg portions. Each conductor is divided into eight sections of equal length, each section in turn being divided into two parts of equal length. The adjacent ends of the two parts of each section are coupled by repeating amplifiers. A train of narrow pulses is coupled to one amplifier of the first section of each line, and a gating signal is applied simultaneously to that amplifier so that the pulses are propagated along the first section of each line to the other end where they are reflected in non-inverted form by the second amplifier. The repetition rate of the narrow pulses applied to each line is increased during the gating signal interval from f to 2f, f being such that a reflected pulse and the next successive applied pulse coincide at the one end of the line section, the coincidence points thus moving from the one line end to the midpoint of each line section. The next successive gating signal is then applied to the second amplifier of the first line section and the pulse train simultaneously applied thereto so that the pulses are propagated and reflected in the opposite direction, the reptition rates now being varied from 2f to f during the second gating signal interval so that the coincidence points move from the midpoint of the line section to the other end. The gating signals and narrow pulses are then applied in sequence to the remaining sections of each line. The gain of the repeater amplifiers of each section of each line is varied in accordance with a video signal. Application of the narrow pulses to each line is terminated at predetermined intervals to allow for retrace times.

39 Claims, 21 Drawing Figures

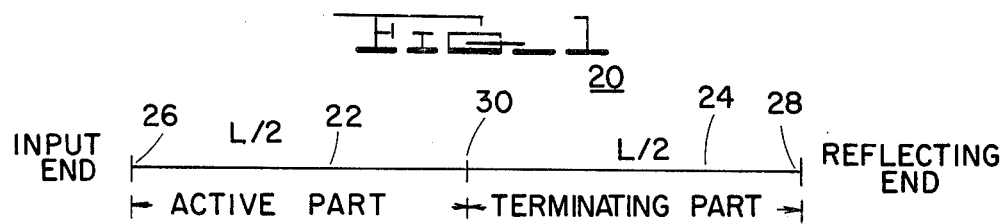
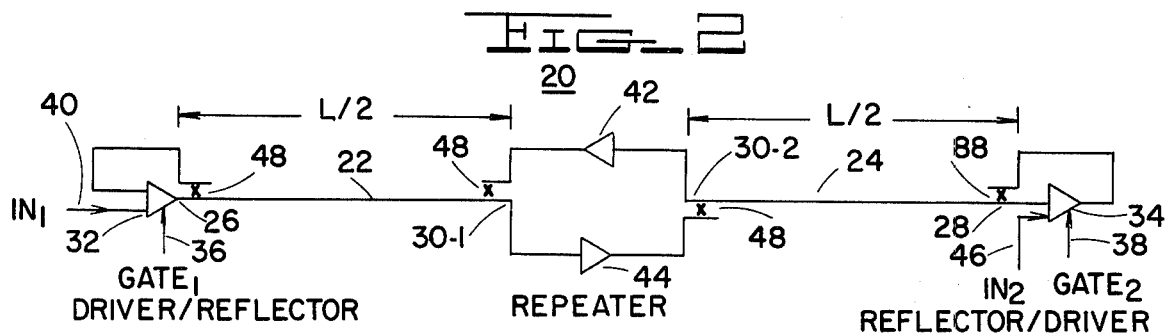
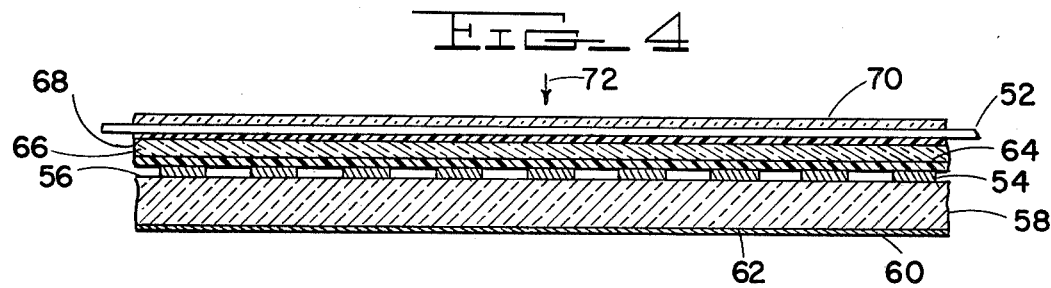
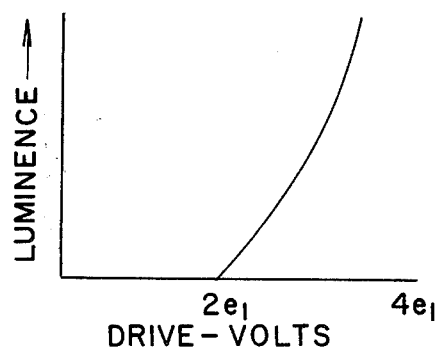

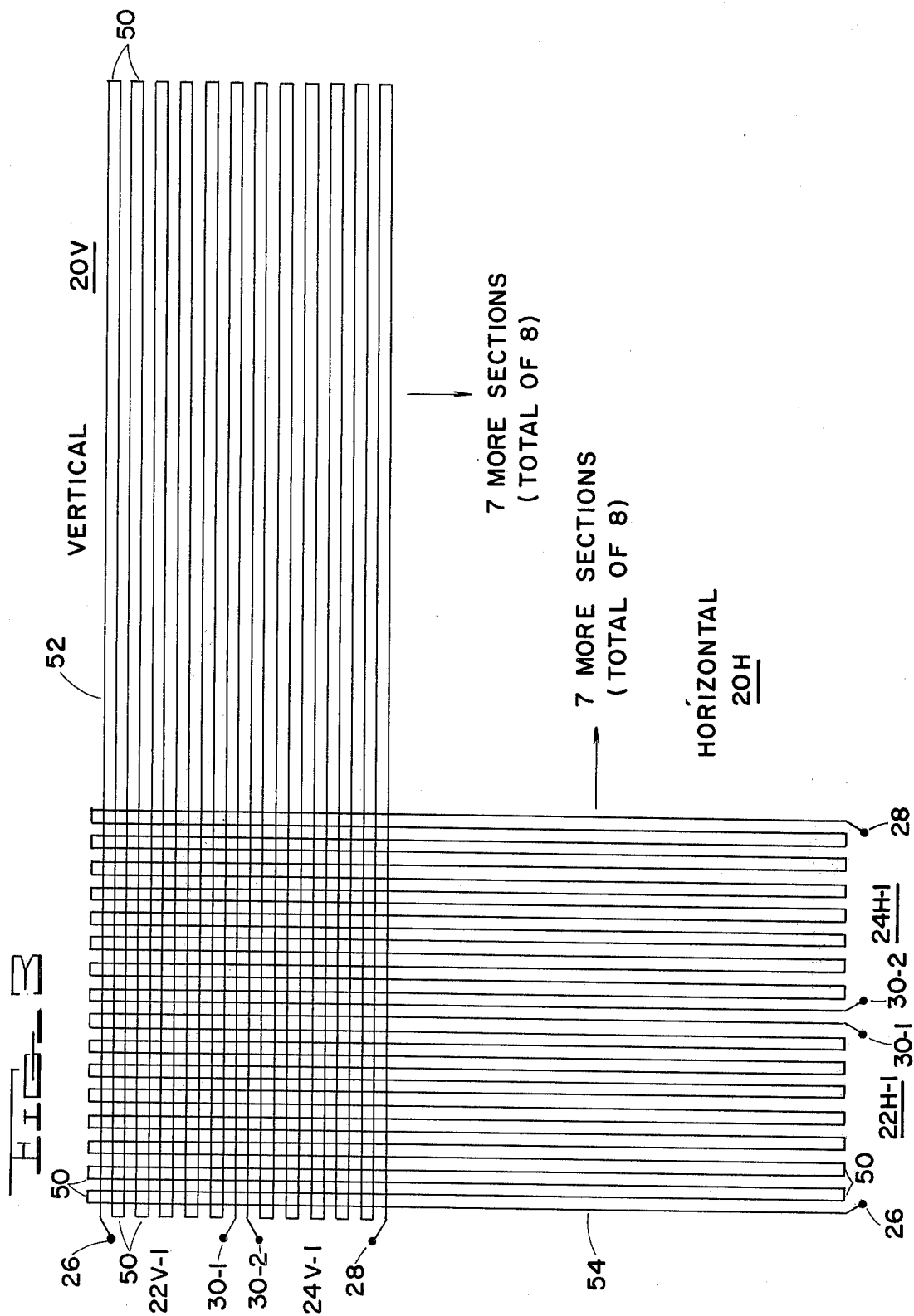

FIG_6
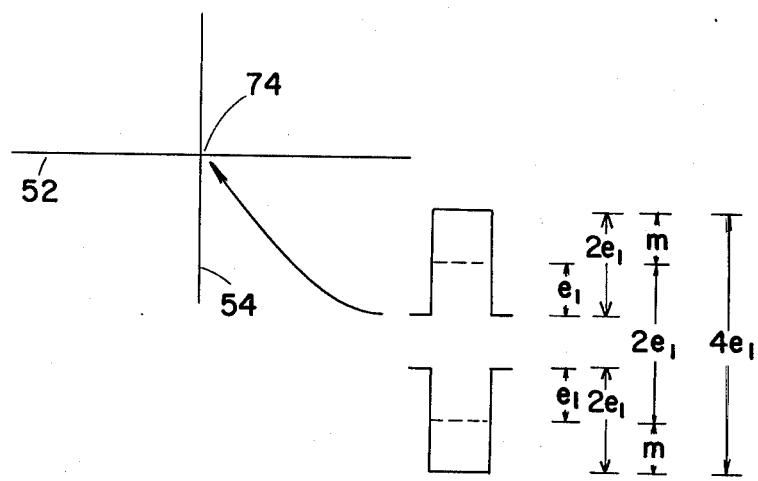
FIG_8
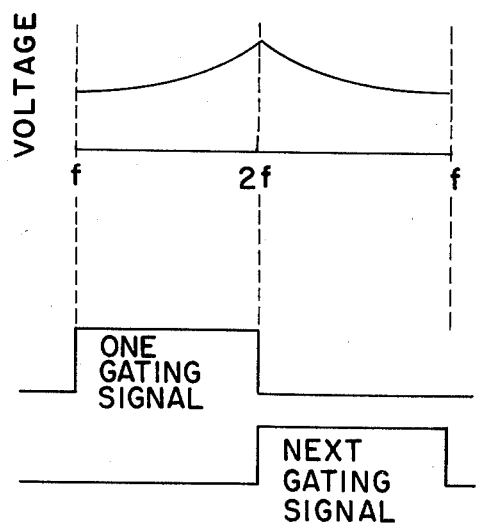

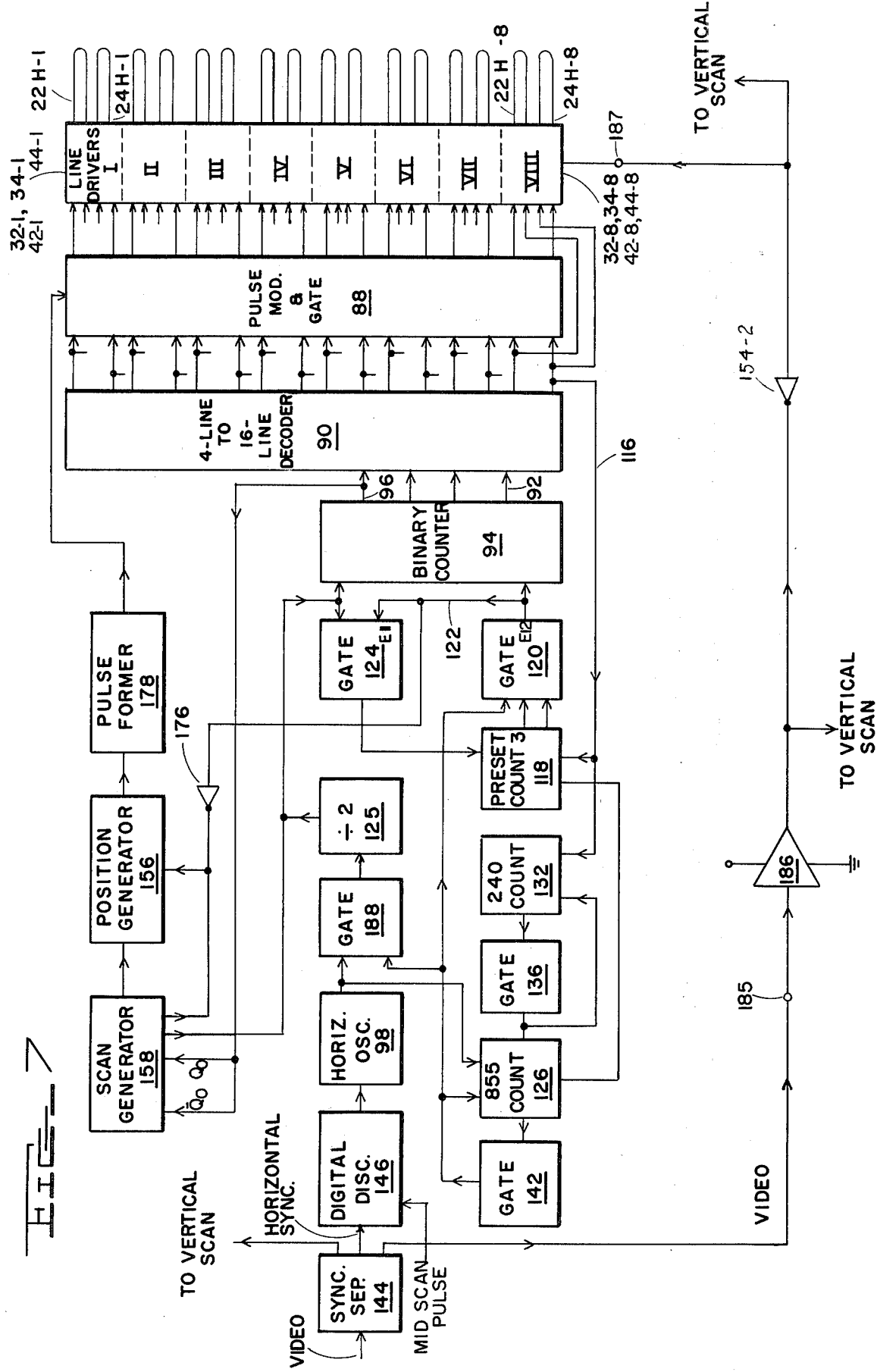

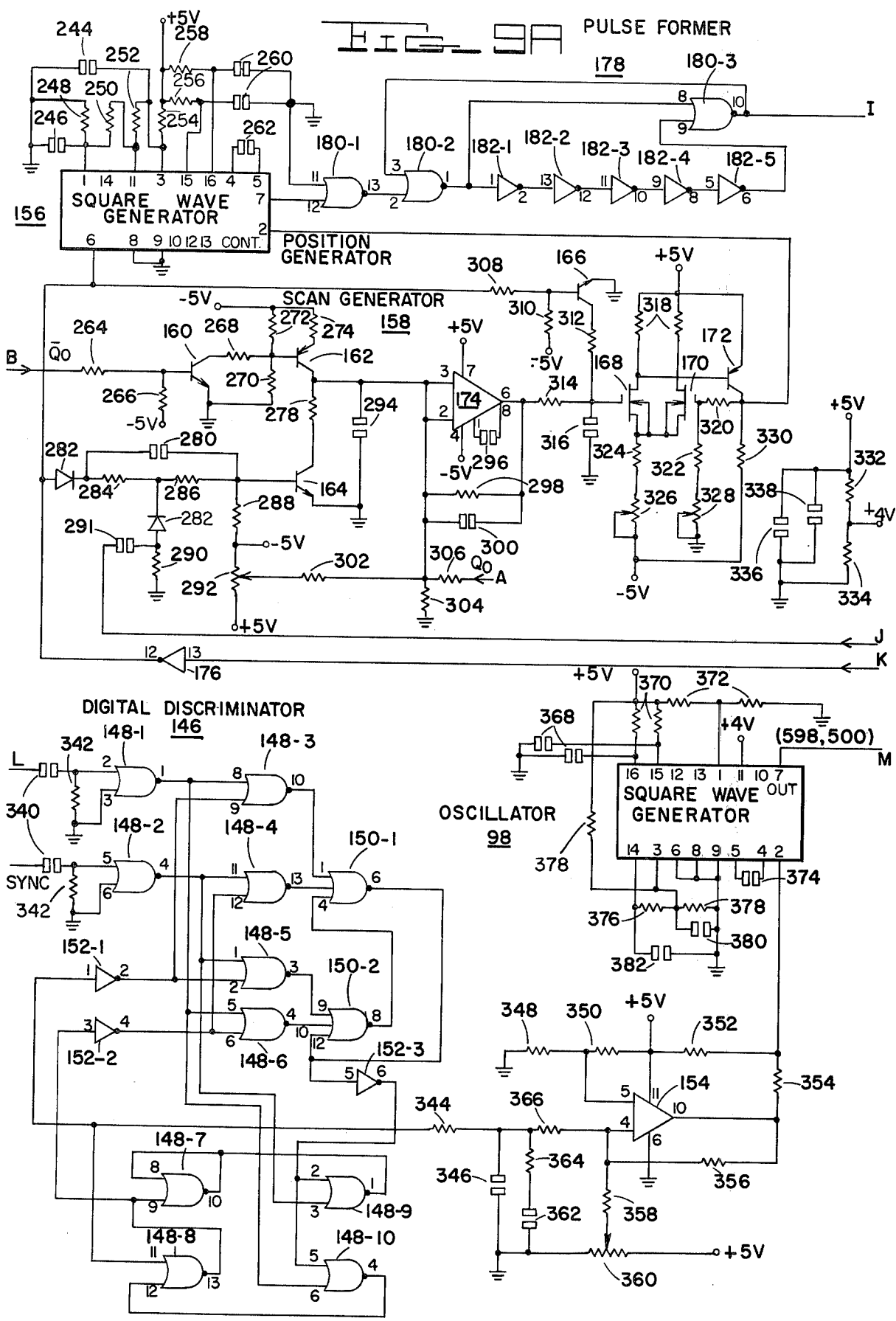

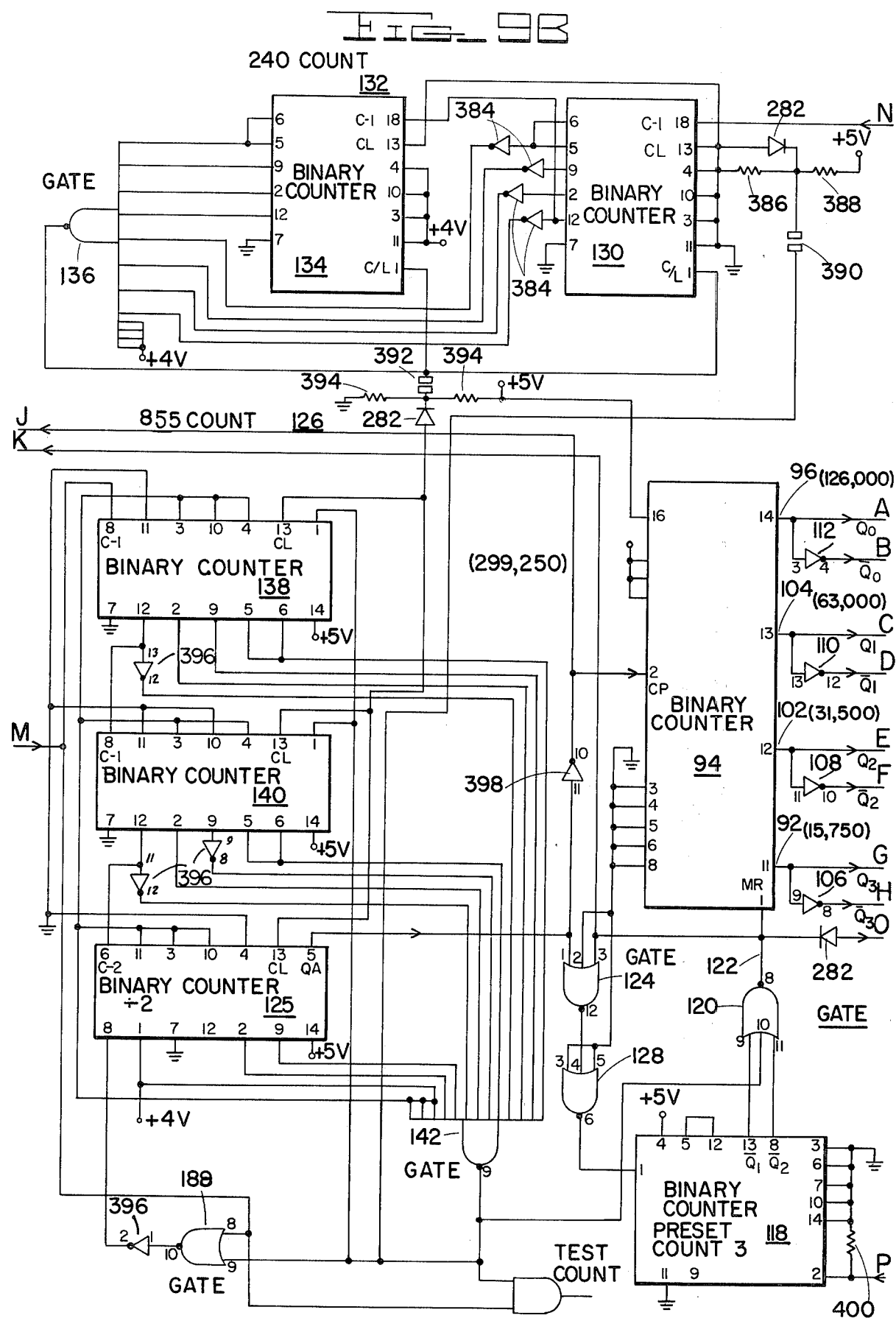

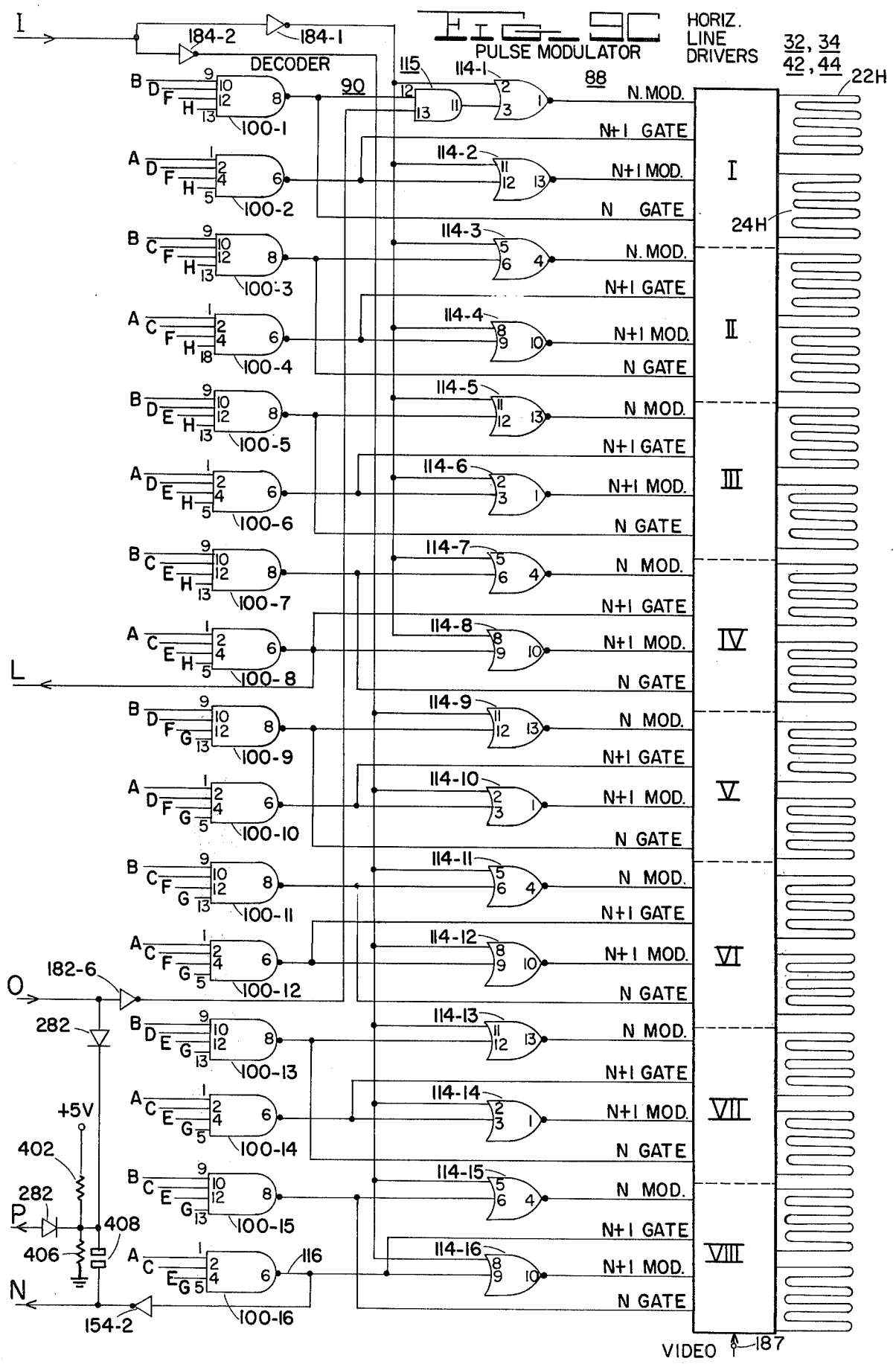

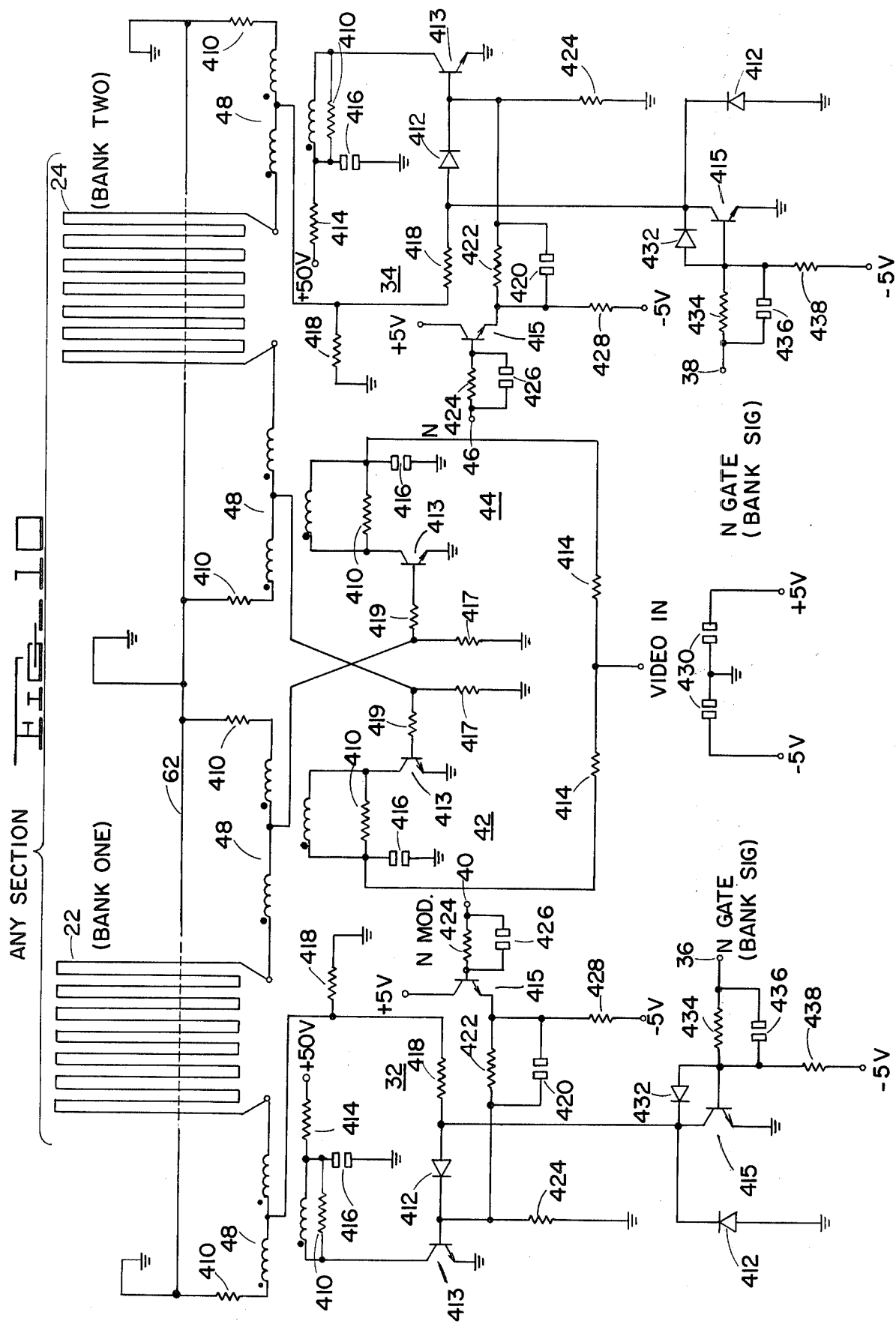

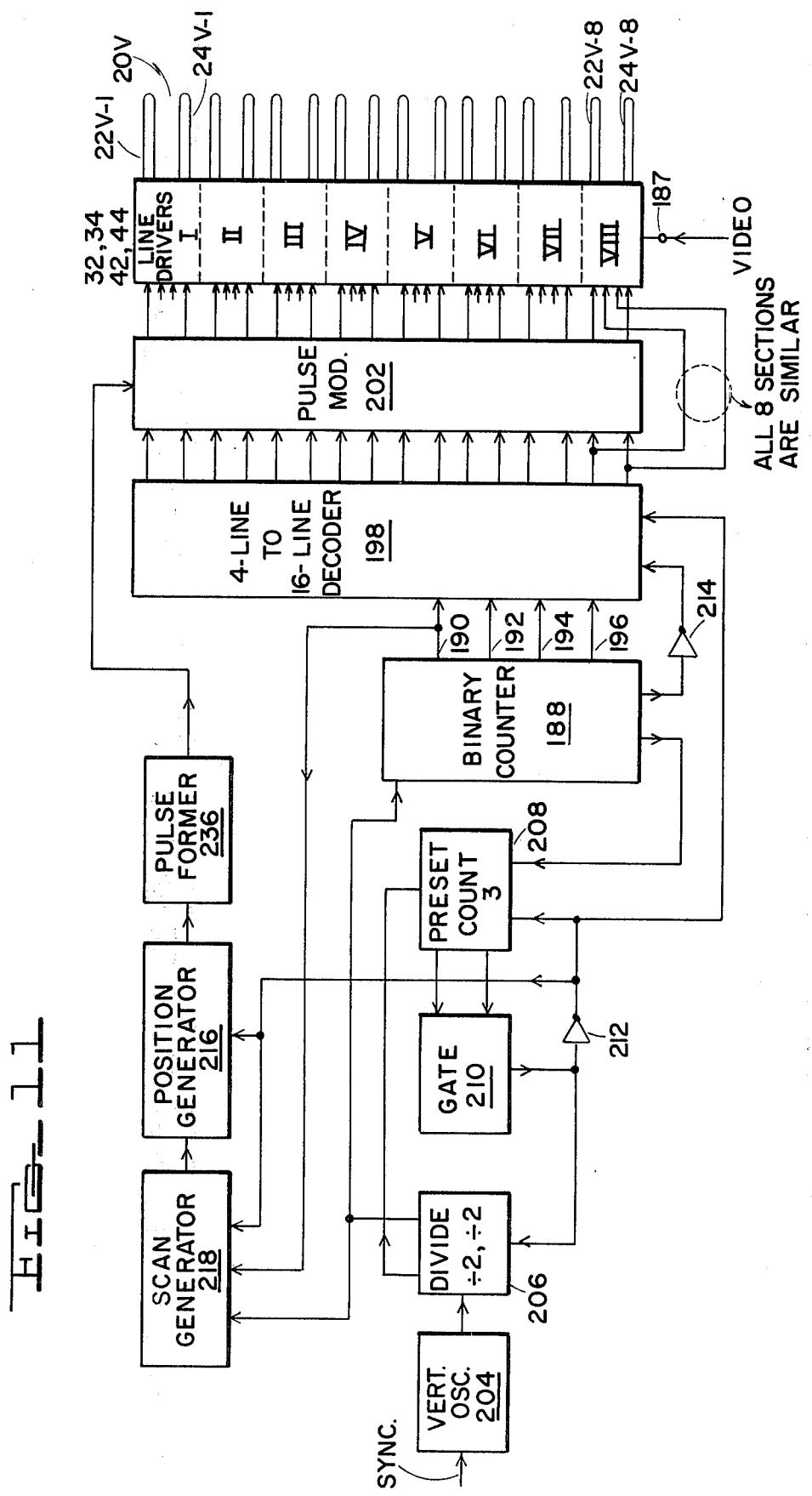

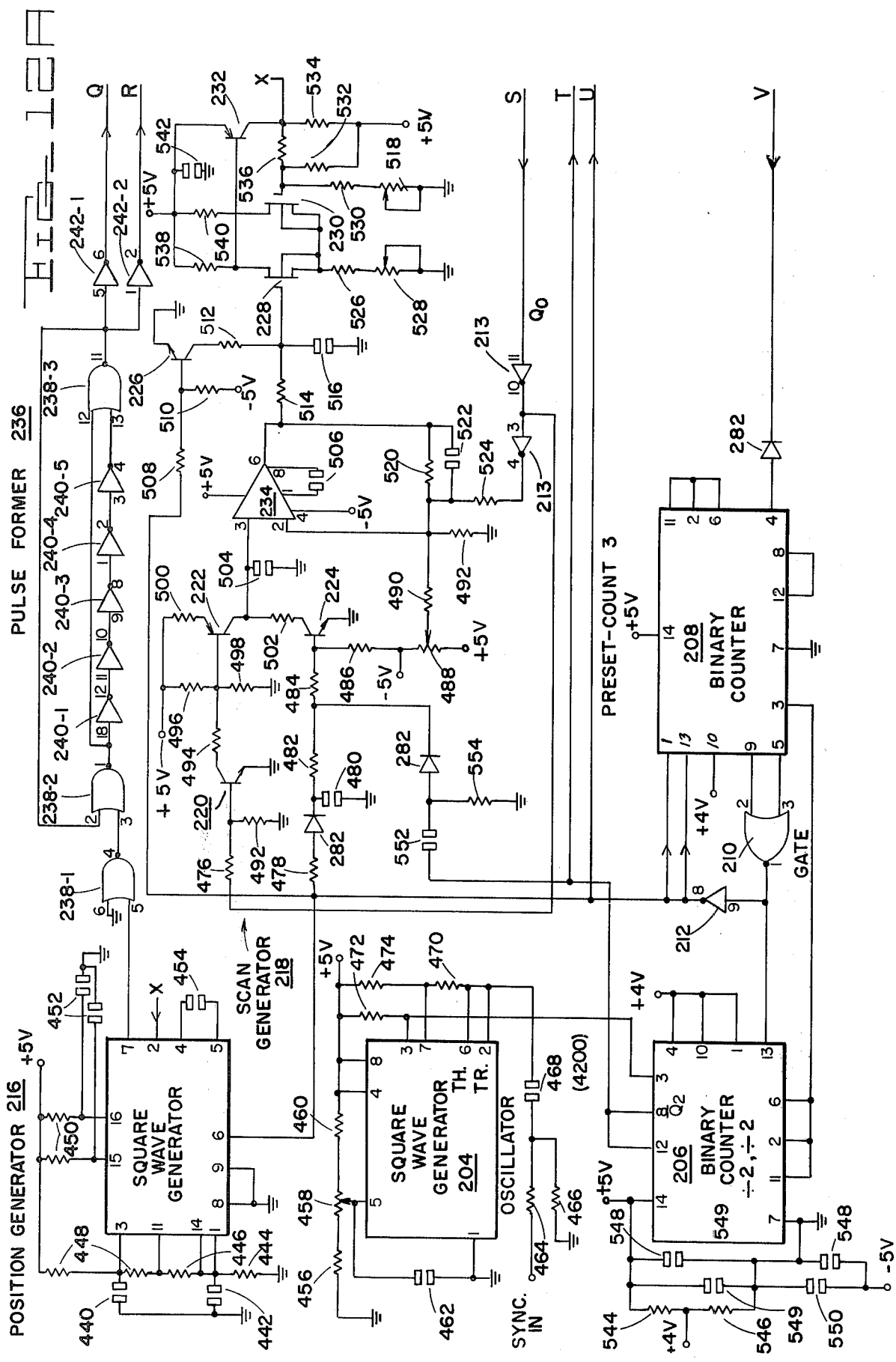

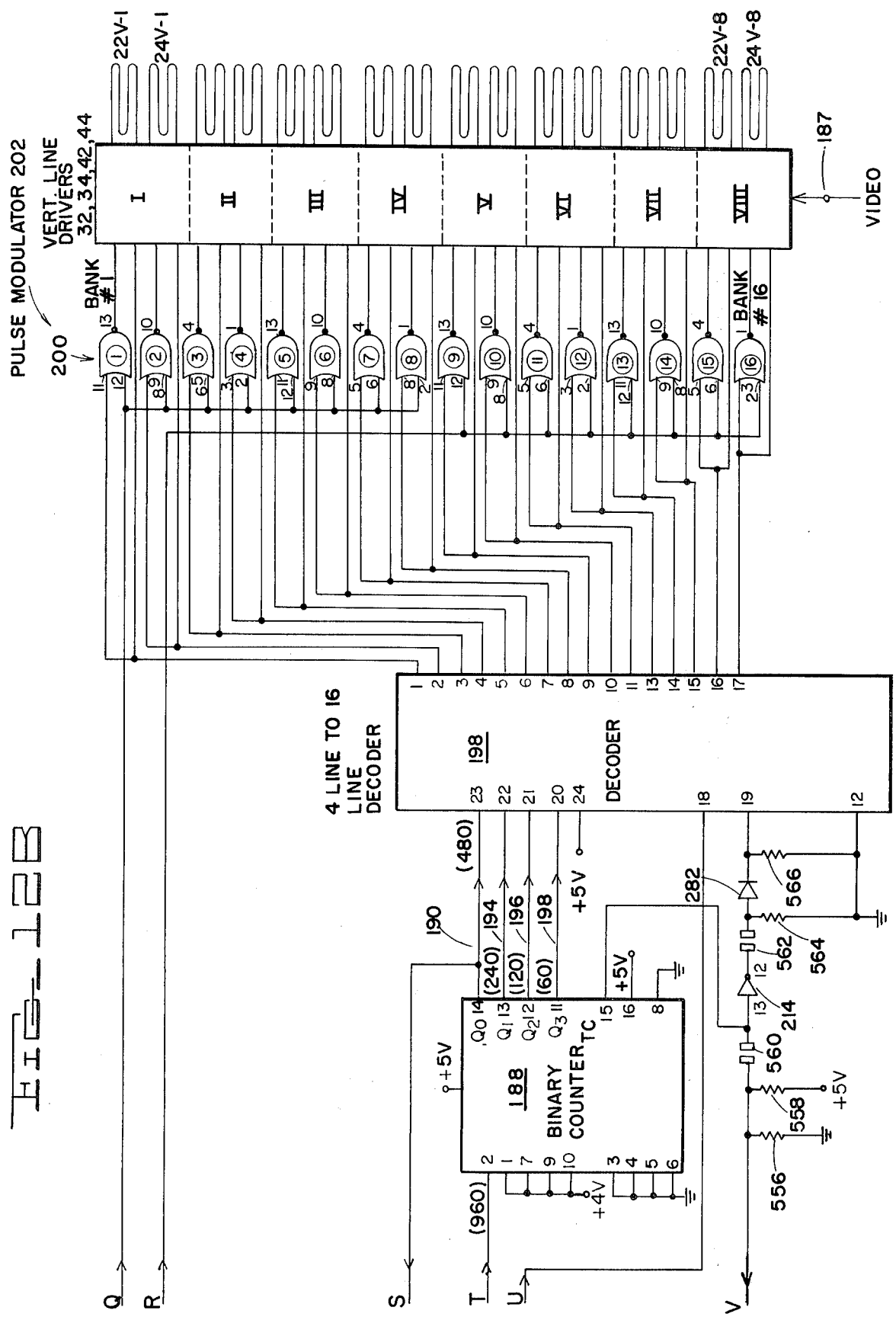

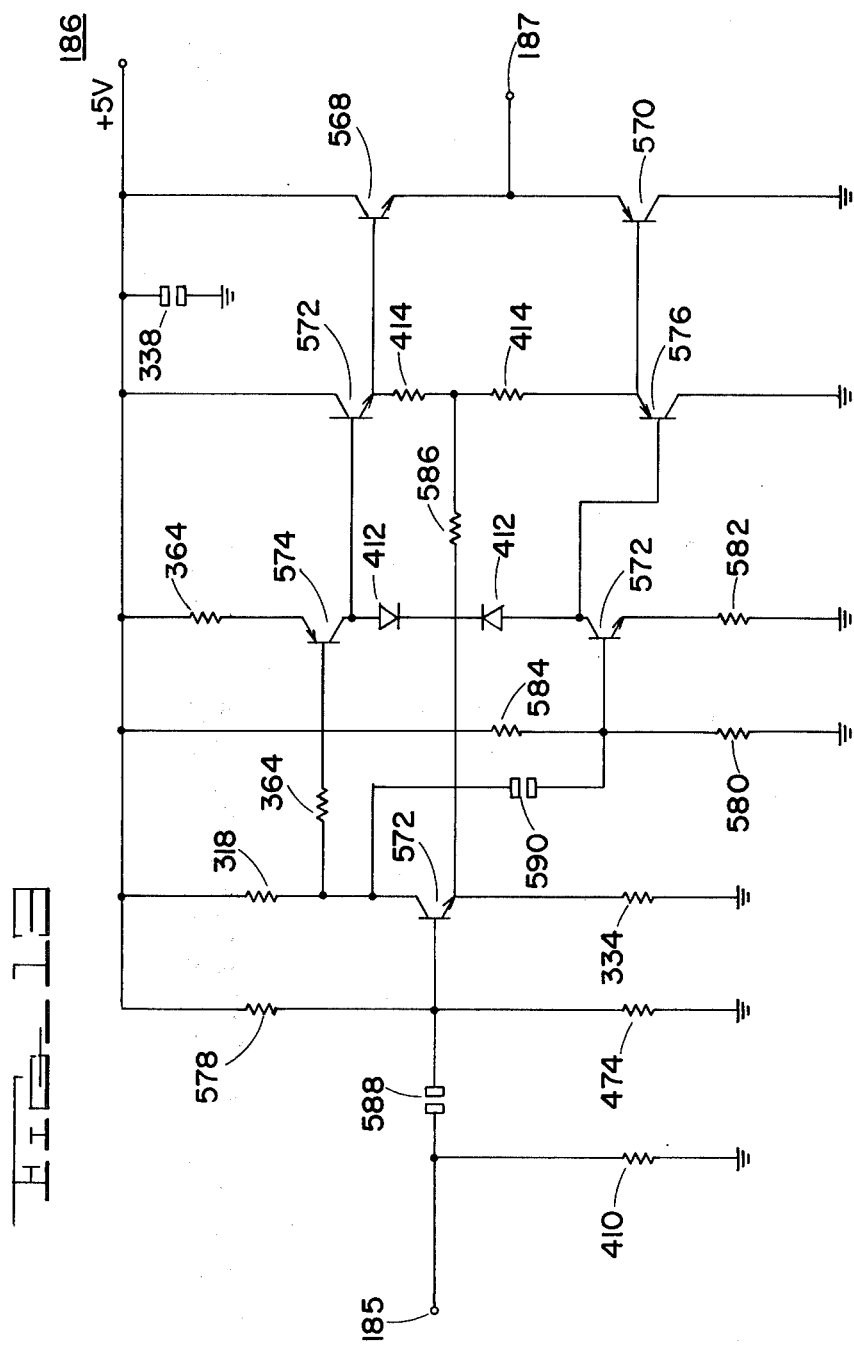

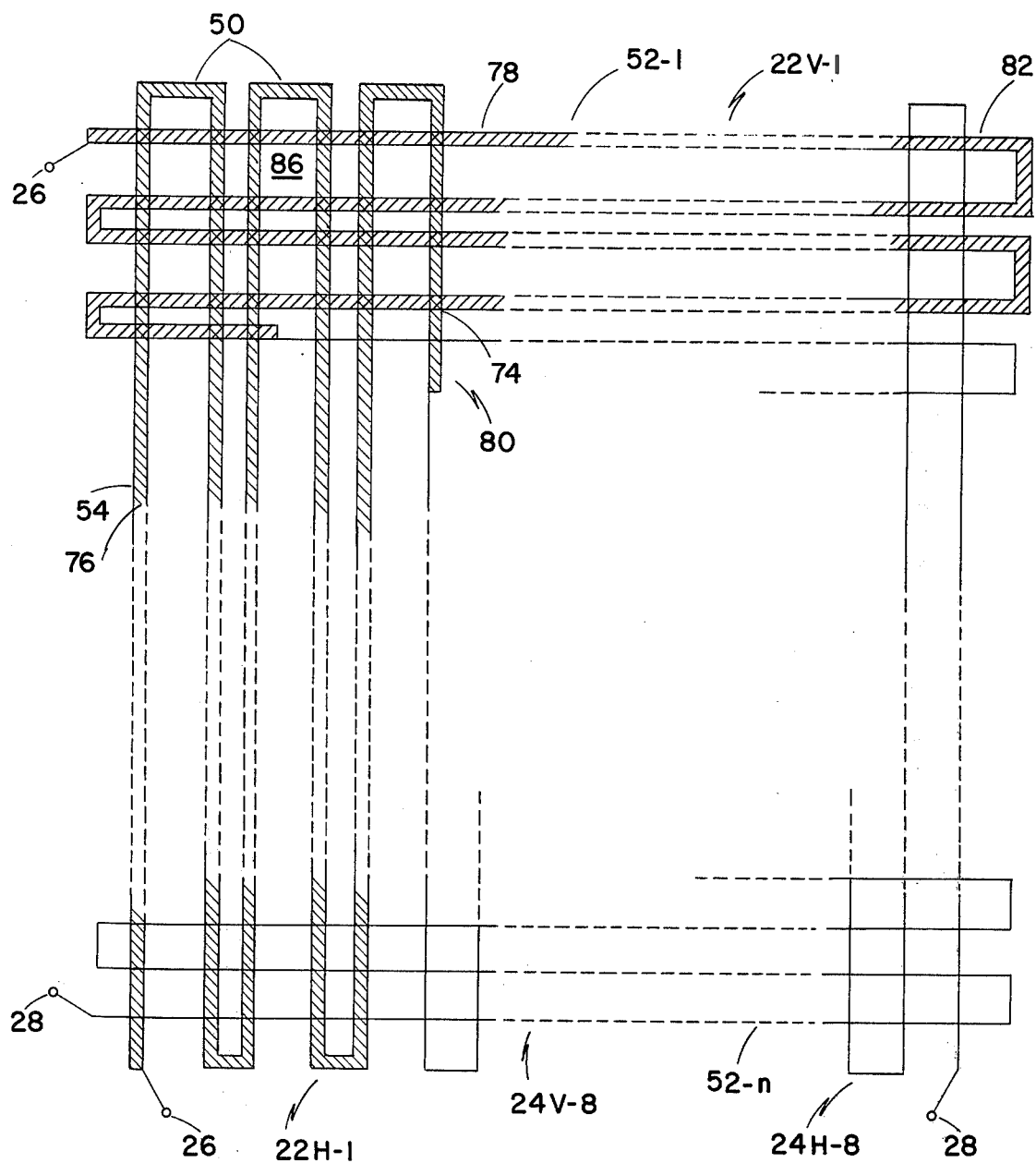

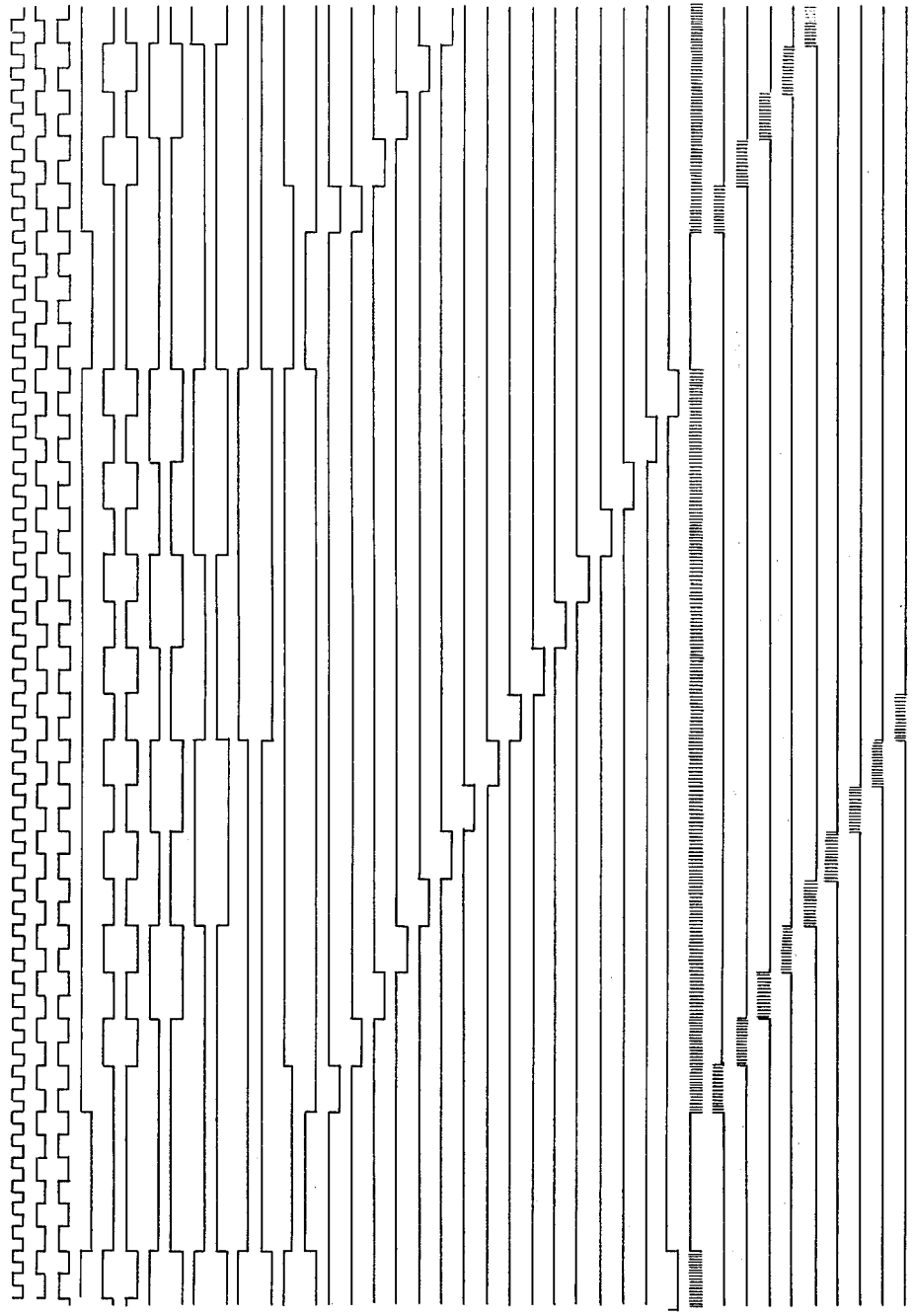

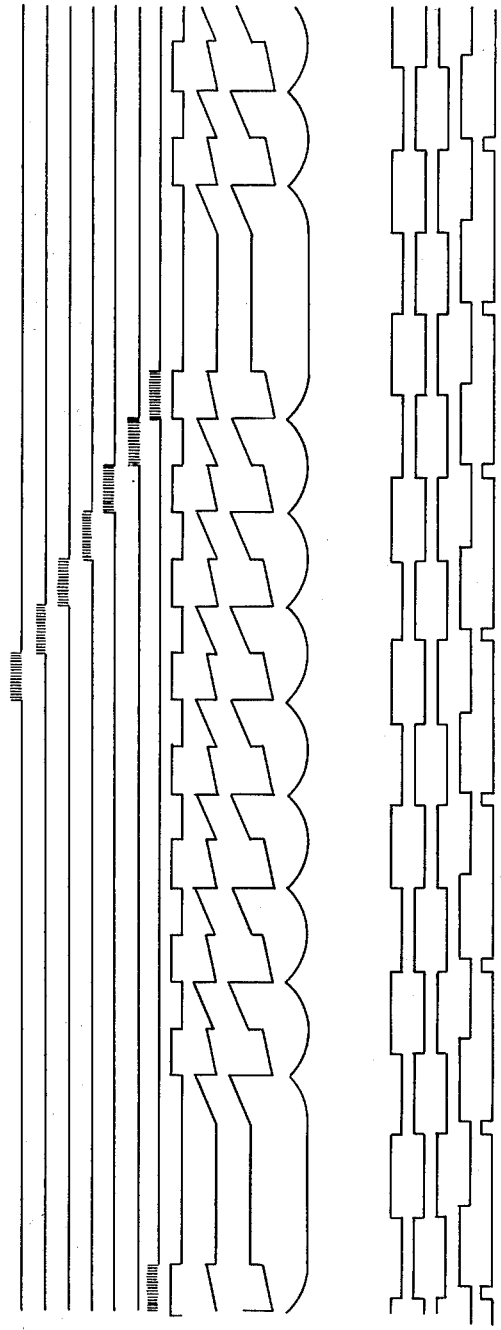

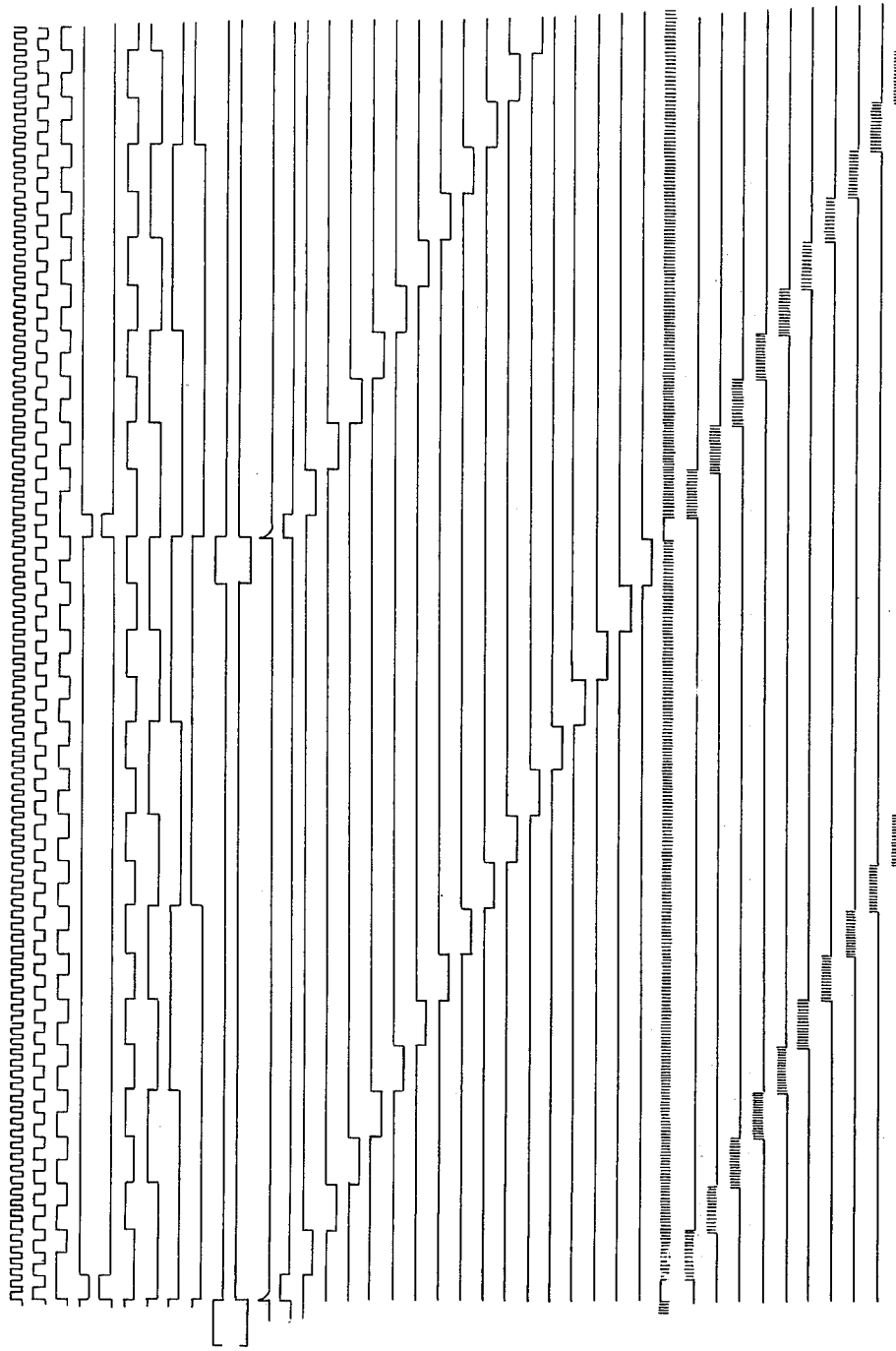

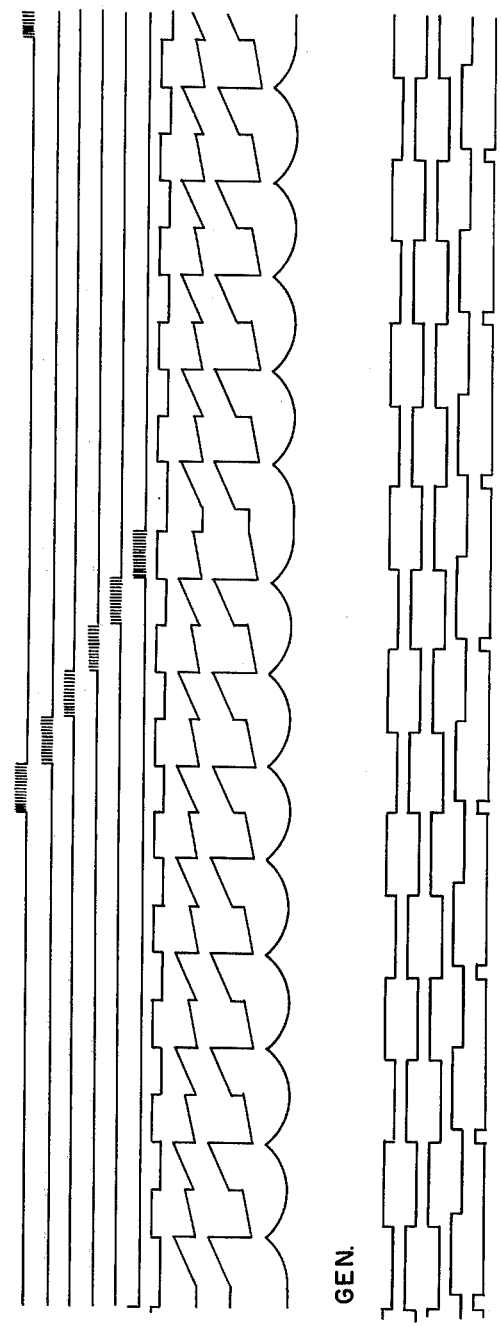

SCANNING SYSTEM AND METHOD USING COINCIDENCE OF VARIABLE FREQUENCY PULSES

BACKGROUND OF THE INVENTION

1. Field of the Invention

This invention relates generally to electroluminescent displays, and more particularly to a system and method for X-Y addressing of a panel having electroluminescent properties.

2. Description of the Prior Art

In 1937, G. Destriau in an article appearing in the *Journal of Chemistry and Physics*, Volume 34, Pages 117–124, described the production of luminescence by application of an electric field to phosphor powders. Since that time, many individuals have continued work in this area with flat-panel television display as their ultimate goal. Much of this work is summarized in an article by B. Kazan entitled "Electroluminescent Displays" appearing in *IEEE Transactions on Consumer Electronics*, Volume CE-21, No. 3, August 1975, pages 237–246. A further description of work done by others in this field appears in *JANAIR Report* No. 720903, AD-75 781, entitled "Electroluminescent Thin Film Research", dated July 15, 1972. An article by W. J. Harper entitled "Pulse Excitation of Electroluminescent Films" appeared in *The Journal of Electrochemical Society* for January 1963, pages 41–46.

As described in the aforementioned literature, in general electroluminescent panels have been addressed by a cross-grid, X-Y electrode structure on opposite sides of the panel. To excite a selected element defined by the cross-over or intersection point of an X electrode and a Y electrode, voltages are applied to the two electrodes of sufficient magnitude to excite the panel to luminescence at the cross-over point; however, one-half of the exciting voltage also appears across all of the remaining elements along the selected X and Y electrodes thus leading to a low contrast ratio. As further described in the above-mentioned literature, various methods have been tried for reducing the problem of cross-talk or excitation of unselected elements in order to increase resolution and contrast ratio.

U.S. Pat. No. 3,590,154, to Anthony C. Moricca discloses a flat panel display system employing a delay line with standing waves moved therealong in order to excite selected areas of the panel.

SUMMARY OF THE INVENTION

In its broader aspects, the invention provides a display system including a panel having electroluminescent properties, and scanning apparatus for exciting selected areas of the panel to cause luminescence thereof. The invention provides improved scanning apparatus for such a system including an elongated conductor having opposite ends and conductive means spaced from the conductor and forming a transmission line therewith, the panel being disposed between the conductor and the conductive means and being insulated therefrom. Means are provided for generating a train of narrow signal pulses, and means are provided coupling the generating means to one end of the line for applying the narrow pulses thereto so that the pulses are propagated along the line toward the other end thereof, the other end of the line being adapted to reflect non-inverted pulses back toward the one end. Means are provided for varying the repetition rate of the pulses between f and 2f where f is such that a reflected pulse and the next successive applied pulse coincide at the one line end so that the points of coincidence of the reflected and applied pulses are moved between the one line end and a point midway between the ends of the line, the amplitudes of the reflected and applied pulses adding at the coincidence points to excite areas of the panel between the conductor and the conductive means.

The invention, in its broader aspects, also provides a method of causing luminescence of selected areas of a panel which has electroluminescent properties, the panel having an elongated conductor on one side thereof and conductive means on the other side, the conductor having opposite ends and defining a transmission line with the conductive means. The method of the invention includes the steps of applying a train of narrow pulses to one end of the line so that the pulses are propagated along the line toward the other end thereof, and reflecting the pulses in non-inverted form at the other end of the line so that the reflected pulses are propogated back along the line toward the one end thereof. The repetition rate of the pulses is varied between f and 2f where f is such that a reflected pulse and the next successive applied pulse coincide at the one line end so that the points of coincidence of the reflected and applied pulses are moved between the one line end and a point midway between the line ends, the amplitudes of the reflected and applied pulses adding at the coincidence points to excite areas of the panel between the conductor and the conductive means.

It is accordingly an object of the invention to provide improved scanning apparatus for exciting selected areas of a panel having electroluminescent properties to cause luminescence thereof.

Another object of the invention is to provide an improved method of causing luminescence of selected areas of a panel having electroluminescent properties.

A further object of the invention is to provide improved raster scanning apparatus for use in an electroluminescent panel system for television display.

Yet another object of the invention is to provide an improved method of raster scanning an electroluminescent panel to provide a television display.

The above-mentioned and other features and object of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1. is a schematic illustration of active and terminating transmission line sections useful in explaining the theory of the invention;

FIG. 2 is a more detailed schematic illustration also useful in explaining the theory of the invention;

FIG. 3 is a schematic illustration of the horizontal and vertical transmission lines employed in the system of the invention;

FIG. 4 is a fragmentary cross-sectional view showing a flat luminescent display panel employed with the system of the invention;

FIG. 5 is a curve generally showing the luminescent properties of the panel of FIG. 4;

FIG. 6 illustrates the amplitude modulation of the double coincident pulses at the cross-over points of the transmission lines of FIG. 3;

FIG. 7 is a block diagram illustrating the horizontal scanning apparatus employed in the system of the invention;

FIG. 8 illustrates the control voltage provided, per section, by the scan generator of FIG. 7;

FIGS. 9A, B and C schematically illustrate the horizontal scanning apparatus;

FIG. 10 schematically illustrates the line and repeater amplifiers employed with the horizontal scanning apparatus of FIGS. 7 and 9, and also employed in the vertical scanning apparatus;

FIG. 11 is a block diagram illustrating the vertical scanning apparatus used in the system of the invention;

FIGS. 12A and B schematically illustrate the vertical scanning apparatus;

FIG. 13 is a schematic illustration of the video amplifier employed in the system of the invention;

FIG. 14 is an enlarged, fragmentary illustration of a portion of the transmission lines of FIG. 3 showing the length of line occupied by the propagated pulses and useful in explaining the operation of the system of the invention;

FIGS. 15A and B show the wave forms found at various points in the horizontal scanning apparatus of the invention; and FIGS. 16A and B show the wave forms found at various points in the vertical scanning apparatus of the invention.

DESCRIPTION OF THE PREFERRED EMBODIMENT

General Theory of Operation

When a signal pulse is applied to one end of an elongated transmission line, it propagates along the line and eventually reaches the opposite end. When the line is terminated in its characteristic impedance, all of signal energy is dissipated in the termination. When the line is unterminated or open at its far end, the pulse will be reflected, i.e., propagated back along the line in non-inverted form. When the line is short-circuited at its far end, the pulse will be reflected back along the line in inverted form.

When the pulse applied to the line is very narrow, it will occupy only a short length of line; the length of line such a pulse will occupy will be the velocity of propagation times the pulse duration. The velocity of propagation of light is approximately 93,600,000 feet per second, which is essentially one foot per nano-second ($10^{-9}$ sec.) and thus, theoretically, a ten nanosecond pulse would occupy ten feet of transmission line. Since the relative velocity of propogation on transmission lines is always less than unity due to distributed capacitance, resistance, inductance and conductance, the length of the line the pulse occupies is proportional to the relative velocity of propagation, i.e., the ratio of the actual to the theoretical velocity of propagation.

When a second pluse is applied to one end of an open, unterminated line before the first pulse has returned to the sending and, the two pulses, the first being now the reflected pulse and the second being the newly applied pulse, will pass and at the position on the line where the pulses pass, i.e., the point of coincidence, their amplitudes will add. This now establishes a position within the line that can be controlled. If the time interval between pulses is decreased, i.e., the repetition rate is made greater, the position of passing or coincidence will be further down the line toward the open ends; if the time interval is made longer, coincidence will occur closer to the sending end. Thus, by controlling the repetition rate of the application of pulses to the line, the position of coincidence can be made to move at a predetermined constant rate along the line; however, a single position of coincidence can exist on the line only within a frequency ratio of 1 to 2 for the repetition rate f where f is the repetition rate for pulse coincidence at the sending end of the line.

It will now be readily seen that this method can be used for scanning a raster to excite an electroluminescent panel to provide a television display. A raster size of 18 inches for the vertical and 24 inches for the horizontal provides a size similar to present-day large-screen television. Presentday television in the United States has a definition band width of approximately 3.5 Mhz and the active part of one horizontal line scan is approximately 53 micro seconds. Therefore, the bits of information needed to provide for the available definition capability is the product of band width and line time, i.e. $3.5 \times 10^{-6}$ Hz $\times 53 \times 10^{-6}$ sec. = 185.5 bits; the (0.05 ) can be ignored. As stated above, each length of transmission line has a maximum pulse repetition rate that will allow one and only one position of pulse coincidence on the line, i.e., 2f. This allows only the first one-half of the line to be used for positions of coincidence; if the frequency is higher than 2f, there will be a coincidence point on the second line half in addition to one on the first half. Referring now to FIG. 1, there is shown, generally indicated at 20, a section of transmission line having two parts 22, 24 of equal length (L/2) respectively designated as the "active part" and "terminating part", end 26 being designated as the input or sending end and end 28 being the reflecting end. The two line parts 22, 24 are coupled in series at their midpoint 30. It will be readily understood that the ground plane or other conductor which completes transmission line 20 is not shown in FIG. 1.

The standard television raster in the United States contains a total of 525 lines. Some of these lines are used for vertical retrace blanking and therefore are inactive insofar as picture content is concerned. Using the maximum time for vertical retrace, i.e., 0.08 frame time, leaves 483 lines for picture content. Three (3) lines will not be missed, and the remaining 480 lines is a number very compatible with a binery counting system. With the 18 inch by 24 inch raster mentioned above, the total length of transmision lines becomes 480 × 24 ÷ 12 = 960 feet. In accordance with a specific embodiment of the invention, the 960 feet of line is divided into eight (8) sections of 120 feet each. For pulse coincidence to occur at the input end of one 120 feet section of line, assuming unity relative velocity propagation, the repetition rate would be 4.17 Mhz; for a lower relative velocity of propagation, the repetition rate would be proportionately less; the actual relative velocity propagation is approximately 0.84 which produces 185 bits of information per line, and the repetition rate for coincidence at the input end of the line is 3.5 Mhz which, coincidentally is the receiver band width. Thus, to move the point of pulse coincidence from the input end of the line 26 to midpoint 30 requires increase of the repetition rate from 3.5 to 7.0 Mhz. It will be observed that the definition capability has been doubled; however, the actual definition obtainable is governed by the receiver band width.

Referring now to FIGS. 2, 3 and 4, each 120 foot section of line 20 is divided into two equal 60 feet half-sections or parts 22, 24. Each of the two parts 22, 24 is driven by an amplifier 32, 34. Amplifiers 32, 34 respectively have gating signal input circuits 36, 38 and are converted or switched from a reflecting, non-inverting amplifier state to a driving amplifier state in response to a gating signal. The train of narrow pulses is applied initially to input circuit 40 of amplifier 32 with a gating signal being applied to gating signal input circuit 36 so that amplifier 32 is in its driving amplifier state and amplifier 34 is in its reflecting, non-inverting state. Repeater amplifiers 42, 44, are coupled to end 30-1 of line part 22 and end 30-2 of line part 24 in order to give one-way gain to restore the pulse amplitudes due to the inherent losses in the line. Driver amplifier 32, generally driven to saturation, supplies the signal level desired, and amplifier 34 also restores full signal amplitude. By making L/2 equal to 60 feet, ignoring the time delays in the amplifiers and assuming a relative velocity of propagation of 0.84, a pulse repetition rate of 3.5 Mhz will produce pulse coincidence at end 26 of line part 22; when the pulse repetition rate is increased to 7.0 Mhz, pulse coincidence will occur at the other end 30-1 of line part 22. At this point in scan time, the gating signal is removed from amplifier 32 and another gating signal is applied to gating signal input circuit 38 of amplifier 34 thus changing amplifier 34 to its driving amplifier state and changing amplifier 32 to its reflecting, non-inverting amplifier state, and the train of narrow signal pulses is removed from signal input circuit 40 of amplifier 32 and applied to signal input circuit 46 of amplifier 34. Line part 22, which normally was the active section, now becomes the terminating section and line part 24, which formally was the terminating section, becomes the active section.

With the input pulses still at the repetition rate of 7.0 Mhz, pulse coincidence will now occur at end 30-2 of line part 24. When the pulse repetition rate is lowered from 7.0 to 3.5 Mhz, the coincidence point is moved to end 28 of line part 24. By controlling the rate of change of the pulse repetition rate between 3.5 Mhz (f) and 7.0 Mhz (2F), the pulse coincidence points can be made to move smoothly and linearly from end 26 to end 30-1 of line part 22, and then from end 30-2 of line part 24 to end 28; however, the rate of change of from f to 2f to f is not linear to obtain linear positioning of the pulse coincidence points along the line. Hybrid transformers 48 are coupled at the output of each amplifier and provide directional isolation of the line which is necessary in order to prevent sustained oscillation. Each part of the line is terminated in its characteristic impedance, the signal being sampled and re-inserted, non-inverted, by the appropriate amplifier.

The system thus far described is basic to both horizontal and vertical scanning; however, the scanning rates and gating signal rates are different for the horizontal and vertical scanning systems to be hereinafter described. For the coincident additive pulses in each combination of lines, i.e., horizontal and vertical, to be additive with each other, it is necessary that the line signals on one be of the opposite polarity to the signals on the other. Otherwise, at the dual point of coincidence between vertical scan and horizontal scan, the impinging signals will be subtractive instead of additive as required. In this system, it was arbitrarily chosen that the horizontal line signals would be positive in polarity and the vertical would be negative in polarity. Referring specifically to FIG. 3, the conductor forming parts 22H and 24H of the horizontal line 20H, and the conductor forming parts 22V and 24V of the vertical line 20V is each folded upon itself a plurality of times, as at 50 to form a plurality of spaced, parallel leg portions 52, 54 which are respectively substantially perpendicular, as shown.

Referring additionally to FIG. 4, horizontal leg portions 54 are supported on side 56 of insulative panel 58 having ground plane conductive layer 60 on its opposite side 62. Layer 64 of insulating material separates leg portions 54 from thin panel 66 having electroluminescent properties. Layer 68 of insulating material separates electroluminescent panel 66 from leg portions 52. Layer 70 of transparent insulating material covers the entire assembly which is viewed from the direction shown by arrow 72.

Referring again specifically to FIG. 3, in the aforementioned specific embodiment providing an 18 inch by 24 inch raster, vertical scanning is performed on 480 horizontally extending lines defined by leg portions 52, and horizontal scanning is performed on 640 vertically extending lines defined by leg portions 54, the total length of each of the lines 20V and 20H being 960 feet each divided into eight sections of 120 feet; only one of the vertical sections 22V-1, 24V-1 and one of the horizontal sections 22H-1, 24H-1 is shown in FIG. 3.

The scanning described above in connection with FIG. 2 is for one 120 feet section only; the remaining seven sections are scanned in sequence and, after each group of eight sections is scanned, scanning is stopped for the applicable retrace time intervals. Horizontal retrace time does not delete any of the scanning lines; however, vertical retrace time deletes 45 lines out of the 525 which is where the number 480 is derived.

Referring now additionally to FIGS. 5 and 6, a pair of line amplifiers 32, 34 are used to drive line parts 22, 24 of each transmission line 20V, 20H, there being a pair of repeater amplifiers 42, 44 for each section used to restore the pulse amplitude to the required level which varies during the scanning cycle. Both the reflection amplifiers, 32 or 34, and the repeater amplifiers 42, 44 terminate the signal, sense the signal, and send it down the line or back the line, as the case may be, restored to full amplitude to compensate for line losses, and in non-inverted form.

Both the line drivers 32, 34 and the line repeaters 42, 44 have a constant supply voltage, the level of which is incrementally changed by the video, and apply to the line a pulse amplitude proportional thereto. Assuming that amplifier 32 is gated to be the driver and amplifer 34 to be the reflector, driver amplifier 32 applies a pulse of amplitude $e_1$ on line part 22. This pulse is propagated down line 22, through repeater amplifier 44, down line part 24, through reflector amplifier 34, back along line part 24, through repeater 42, and back along line part 22. The next successive narrow pulse applied to line part 22 will also have amplitude $e_1$. Assuming that the amplitude of the previous, now reflected, pulse has had its amplitude restored to $e_1$, and recalling that the previous pulse is reflected in non-inverted form, at the coincidence point the first, now-reflected pulse and the next successive applied pulse will add to provide amplitude $2e_1$.

Applying the same principal to the other set of lines perpendicular to the first line, another voltage $2e_1$ will be obtained. The pulse generators for the vertical and horizontal lines 20V, 20H, to be hereinafter described, are arranged so that the polarity of the narrow pulses applied to the vertical line 20V is opposite the polarity of the narrow pulses applied to the horizontal line 20H. Thus, if the duration of the gating signals respectively applied to amplifiers 32, 34 for each of the lines 20V, 20H are properly related so that a point of pulse coincidence on a vertical leg portion or line 52, and a point of pulse coincidence on a horizontal line or leg portion 54 coincides at cross-over 74 (FIG. 6), the summation of the pulse amplitudes will be $4e_1$ gain, i.e., Assuming the luminescence threshold of the electroluminescent material composing panel 66 to be $2e_1$, when repeater amplifiers 42, 44 only, have variable gain, e.g., changing levels of outputs, the pulse amplitude summation becomes:

$$(e_1 + \Delta e_1) + (e_1 + \Delta e_1) = \text{drive}$$

The above formula indicates that when $\Delta e_1$ varies between near zero (0) and $e_1$, the actual drive can be made to vary between $2e_1$ and $4e_1$, i.e., between the luminescence threshold of the electroluminescent material and a higher level which produces increased luminescence. It will now be seen that when the $e_1$ is controlled by a video signal, the drive and the resultant luminescence will be responsive to that video signal and thus, the video is placed on display panel 66. Recalling that the video signal is superimposed on the narrow pulses at repeater amplifiers 42, 44, there will be a variable time delay from the position of the repeater amplifiers to the coincidence points; however, the maximum time delay is so small that the picture display displacement will be undiscernible visually.

Referring now to FIG. 14, it will be recalled that a ten nano-second pulse ($10^{-8}$ second) occupies ten feet of line with unity relative velocity propagation; the same pulse will occupy 8.4 feet of line with 0.84 relative velocity of propagation. In FIG. 14, a coincident pulse 76 is shown on horizontal line 20H at end 26 of horizontal line part 22H-1, and a coincidence pulse 78 is shown on vertical line 20V at end 26 of vertical line part 22V-1. Recalling that the pulses will occupy approximately 8.4 feet of line, it will be seen that with the gating signals properly related, coincidence of the coincident pulses on each line 20V, 20H will actually occupy an area 80 defined by a plurality of cross-over points 74.

The duration of the gating signals for the amplifiers 32, 34 of lines 20V, 20H are so related that trailing end of coincidence point 54 on line 20H moves from end 26 of line part 22H-1 to end 28 of line part 24H-8 in the same time that the trailing end of coincident point 78 on vertical line part 22V-1 moves from end 26 to end 28 of leg portion 52-1. At this point, provision is made for horizontal retrace, as will be hereinafter described. It will be seen that area 80 of coincidence will drift from left to right and from top to bottom during one frame. When the leading edge of coincident pulse 78 on vertical line 20V reaches end 28 of vertical leg portion 52n, vertical retrace occurs as will be hereinafter described.

While coincident area 80 seemingly occupies an appreciable area of display panel 66, it will be recalled that the actual amplitude of the coincident pulses 76, 78 is constantly varying in response to the video signal thus constantly up-dating the video information and further, than the video signal is blanked for horizontal retrace during a portion of each line and thus, the actual picture resolution is provided by an area 86 defined by a relatively small number of cross-overs 74, such as four.

Horizontal Scanning System

Referring now to FIGS. 7, 8, 9A, 9B, 9C and 10, and it being recalled that horizontal line 20H is divided into eight horizontal line-scanning sections, the division of each line section into two equal parts 22H, i.e., sixteen parts, requires the generation of sixteen gating signals for sequentially gating amplifiers 32, 34, and the generation of sixteen pulse trains for driving the sixteen line parts. An allotted time is assigned for each gating signal (during which a plurality of narrow pulses are generated), an allotted time is assigned for horizontal retrace, and an allotted time is assigned for vertical retrace. These allotments must be pro-rated to the respective vertical and horizontal signals, and must be numerically compatible with the binary counting system.

Current U.S. television standards specify approximately 63.5 microseconds per line of which approximately 10.5 microseconds is for horizontal retrace, i.e., the inverse of the line scanning frequency of 15,750 Hz. Sixteen (16) equally timespaced gating signals are generated for gating the sixteen (16) line parts 22H, 24H, and three more time increments respectively having the same duration as the gating signals are provided for horizontal retrace, i.e., a total nineteen (19) time intervals are provided. Thus, by dividing each horizontal line scanning period into nineteen parts, a single increment train is obtained that very closely matches the standard.

The sixteen (16) driving pulse trains are applied in sequence to the sixteen (16) horizontal line parts 22H-1, 24H-1 through 22H-8, 24H-8 by pulse modulator and gating circuit 88; each of the sixteen (16) pulse trains determines the coincidence points within the respective line part 22H, 24H. The sixteen (16) steady-state section gating signals are applied in sequence to the respective amplifiers 32-1, 34-1 through 32-8, 34-8 by 4-line to 16-line decoder 90; these gating signals respectively coincide with the pulse trains sequentially applied to horizontal line parts 22H, 24H.

The pulse numbers described are based upon the horizontal line scanning rate output 92 of binary counter 94 being exactly 15,750, i.e., 525×30 (the frame scanning rate); the horizontal line scanning frequency is 14,400 Hz. The output signals from binary counter 94 to be multiplexed must be considered by both "rate" and "frequency". The "frequency" is the number of pulses per second, while the "rate" is the number of pulses per second before certain pulses are disabled to allow for retrace times; the remainder of pulses after disabling is the frequency, i.e., the rate per second that the pulses occur.

The frequency of the gating signal output 96 of counter 94, i.e., the $Q_0$ frequency is 115,200 Hz, and the rate is 126,000, i.e., eight times the line scanning frequency and rate, respectively. Counting by binary counter 94 for horizontal retrace and vertical retrace occurs at a clock pulse input rate of 299,250. There are 525 lines in the U.S. standard television signal. Each line is counted in multiples of nineteen (19) increments, sixteen (16) for the active part of the scan and three (3) for the inactive part or horizontal retrace. The framing rate is thirty (30). The product of these three (3) numbers (525 × 19 × 30) is 299,250. As indicated, the gating signal frequency is 115,200 Hz, i.e., after elimination of 10,800 pulses for retrace times, this making the rate 126,000. The pulses eliminated or gated for retrace times are 480 × 3 × 30 = 43,200 for the horizontal scanning and 45 × 19 × 30 = 25,650 for vertical retrace. The total of the products of pulse gating is 43,200 + 25,650 = 68,850. Since pulse elimination or gating is performed at twice the rate of the $Q_0$ gating signals, the gating frequency signal must be doubled; 115,200 Hz × 2 = 230,400 which, when added to the 68,850 yields exactly 299,250, the clock pulse input frequency to binary counter 94. In the U.S. standard television system, every other line is scanned once and then the remaining intermediate lines are scanned during each frame, referred to as interlace. In order to count 22½ (45 × ½) for vertical retrace, it is necessary to double the clock pulse frequency in order to count forty-five. Thus, the frequency output of oscillator 98 is 598,500 Hz, i.e., 299,250 × 2.

Decoder 90 comprises gates 100-1 through 100-16 (FIG. 9C) coupled to outputs 92, 102, 104 and 96 of counter 94 both directly and through inverters 106, 108, 110 and 112 (FIG. 9B) with the 15,750, 31,500, 63,000 and 126,000 rate pulses in both non-inverted and inverted form applied to the input circuits of gates 100-1 through 100-16, in the permutations shown in FIG. 9C, the 126,000 rate gating signals appear sequentially in the output circuits of gates 100-1 through 100-16 and are applied sequentially to gates 114-1 through 114-16 of pulse modulator 88 with gate 115 providing the proper time to the length of modulation by gating retrace time out of this signal via signal 122 inverted by 182-6.

When the output gating signals have been sequentially switched through one complete cycle, the trailing edge of the output gating signal in output circuit 116 of gate 100-16 (FIG. 9C) inverted by 154-2 sets the count 3 binary counter 118. Gate 120 (FIGS. 7 and 9B) senses the change in $\overline{Q}_1$ of counter 118 and blocks counter 94 from counting for the duration of three gating signals. Output circuit 122 of gate 120 is coupled to one of the inputs of gate 124. The $Q_A$ of binary counter 125 (which forms a part of the 855 count assembly 126, FIG. 9B) is also coupled to one of the inputs of gate 124 and thus, the $0_A$ signal from counter 125 is applied through gates 124, 128 to the clock input of counter 118 which then counts the next three (3) pulses provided by counter 125. At the completion of the three (3) further counts, gate 120 senses that $\overline{Q}_1$ and $\overline{Q}_2$ outputs of counter 118 being at "0" thus removing the block from counter 94 permitting it to resume counting.

The output signal from gate 100-16 is also inverted by 154-2 and applied to the clock input of binary counter 130 of the 240 count system 132. Binary counters 130, 134 and gate 136 form the 240 count 132 which determines the position for the vertical retrace time interval. 240 Count system 132 thus counts 240 complete cycles of gating signals, i.e., 240 gating signal outputs from the final gate 100-16.

When the 240 count is completed, the output signal from gate 136 blocks counters 130, 134 from further counting and, the leading edge of the output signal from gate 136 is applied to clear binary counters 138, 140 and 125 which comprise the 855 count system 126. The 855 counting system 126 now counts the output pulses from oscillator 98 (FIG. 9A) and when 855 pulses have been so counted, the count stops and the output of gate 142 is applied to clear counters 130, 134 to restart another 240 count. While the 855 count is in progress, the output of gate 142 is applied to an input of gate 120 which blocks counter 94. Thus, the 855 count interval is the time interval for vertical retrace. As indicated above, the 855 count is made at twice the input pulse rate to counter 94 in order to obtain the one-half line count to accommodate interlace; the 855 count is twice the product of 22½, the number of lines in vertical retrace blanking per scan, times the number of gating pulses per line (19). Thus, the clock pulse input rate to the CP input terminal of counter 94 from the $Q_A$ output terminal of counter 125 is 299,250 Hz while oscillator 98 generates pulses at twice that rate, i.e., 598,500 Hz.

Horizontal oscillator 98 is frequency and phase-synchronized with the horizontal synchronizing pulses contained in the composite video signal and the output of gate 100-8. The horizontal synchronizing pulses are separated from the composite video signal by sync. separator 144 (FIG. 7). Digital discriminator system 146 (FIGS. 7 and 9A) comprises gates 148-1 through 148-10, 150-1, 150-2, and inverters 152-1, 152-2 and 152-3, and amplifier 154. The horizontal frequency control voltage is derived from a comparison of the horizontal synchronizing pulses and the output signal from gate 100-8 (FIG. 9C). Discriminator 146 acts as a frequency discriminator when the two input frequencies are non-synchronous, and as a phase discriminator when they are synchronous.

Position generator 156 (FIGS. 7 and 9A) is a voltage-controlled square wave generator. In order to sweep the coincidence points of the reflected and applied pulses along the line in linear fashion, a square law control voltage is generated by scan generator 158 for controlling position generator 156. Referring briefly to FIG. 8, the square law control voltage is shown which varies the output frequency of position generator 156 from f to 2f during one gating signal, and from 2f to f during the next gating signal. This square law voltage is developed by transistors 160, 162, 164, 166, 168, 170 and 172, amplifier 174 and the associated circuitry as shown in FIG. 9A. The signals for controlling scan generator 158 are the $Q_0$, $\overline{Q}_0$ output signals from counter 94 at the 126,000 rate, the 299,250 rate clock pulses, and the count disable signals from gate 120 (FIG. 9B) inverted by inverter 176 (FIG. 9A).

Pulse former 178 comprises gates 180-1, 180-2 and 180-3, and inverters 182-1 through 182-5. Pulse former 178 develops the narrow display pulse which is propagated down and reflected back along the line. The width of the pulse is dependent upon the accumulated propagation delay of inverters 182-1 through 182-5 which must be an odd number. Gate 180-3 drives inverters 184-1, 184-2 (FIG. 9C) which respectively provide gating pulses to gates 114-1 through 114-8 and 114-9 through 114-16.

The video signal from sync. separator 144 (FIG. 7) is amplified by amplifier 186 and applied to input terminal 187 of repeater amplifiers 42, 44 for each line section of horizontal lines 20H and vertical lines 20V (FIGS. 7 and 10).

To summarize, square wave oscillator 98, synchronized with the horizontal synchronizing pulses and at the midpoint of the scan by discriminator 146, generates timing pulses at a rate twice the rate of the gating pulses plus the pulses omitted to accommodate retrace. The timing pulses from oscillator 98 pass through gate 188 and inverter 396 to divide-by-two (2) counter in 125 and then to counter 94 inverted by 398 which provides in its four outputs 92, 96, 102, 104 (FIG. 9B) the gating pulses, and pulses having one-half, one-quarter and one-eighth the gating pulses pulse the later being the scanning rate. The logic of decoder 90 applies or steers the gating pulses sequentially to the sixteen (16) pulse modulating gates 88, and also to the sixteen (16) line driver and repeater amplifiers 32, 34 and 42, 44 which respectively sequentially drive the sixteen (16) horizontal line parts 22H, 24H.

The end of every sixteenth gating pulse is sensed by preset then count 3 counter 118 (one preset count plus three counts) which, through gate 120, blocks counter 94 and actuates gate 124 to pass the next three clock pulses from frequency divider 125 to counter 118 via inverter 128. At the end of that three clock pulses which accommodate line retrace time, gates 120 and 124 are enabled so that counter 94 resumes counting the clock pulses. The 240-count counter 132 counts 240 of the last gating pulses of each cycle of sixteen (16) gating pulses and, at the end of the last 240th such final gating pulse, actuates the 855-count counter 126 which enables gate 142 which, in turn enables gates 188 and 120 to block further counting by counter 94. 855-Count counter 126 then counts 855 timing pulses from oscillator 98 which, as explained above, accommodates the vertical retrace. At the end of the 855 count, gates 142, 188 and 120 are again enable to permit counter 94 to resume counting.

Voltage controlled oscillator 156 generates square waves from which the pulses are derived to be propagated along horizontal line 20H, the frequency output of oscillator 156 being varied from f to 2f during one gating pulse and from 2f to f during the next successive gating pulse by scan generator 158 to which the gating pulses are applied from counter 94. Pulse former 178 provides the requisite narrow pulses which are employed to pulse-modulate or chop the gating pulses in pulse modulator and gating assembly 88. The video is applied to the repeater amplifiers 42, 44 of each of the line driver sections I through VIII (FIGS. 7 and 10) by video amplifier 186.

Referring to FIG. 13, one circuit for video amplifier 186 (FIG. 7) is shown, it being understood that the video amplifier, per se, is not a part of the invention and that other amplifier circuits may equally advantageously be employed.

Referring briefly to FIGS. 15A and 15B, the wave forms found at various points in the horizontal scanning system of FIGS. 9A, B and C are shown. Finally, FIGS. 16A and 16B show the wave forms found at various points in the vertical scanning system of FIGS. 12A and B.

Vertical Scanning

Referring now to FIGS. 11, 12A and 12B, the vertical scanning system and its mode of operation is similar to the horizontal scanning system, the basic difference being the scanning rate and blanking for the allowed time for vertical retrace only. Here again, sixteen (16) gating signals and driving pulse trains are required for the eight (8) sections of line 20V, each of which is divided into two equal parts 22V, 24V.

Binary counter 188 provides in its four outputs 190, 194, 196, and 198 pulses equal in frequency and rate to the gating signals, and pulses having frequency and rate which respectively are one-half, one-quarter and one-eighth that of the gating signals. Decoder 198 which forms the 4-line to 16-line decoding applies the gating signals in sequence to gates 200-1 through 200-16 which comprise pulse modulator 202. The frequencies of the pulses provided in output circuits 190, 194, 196 and 198 of counter 188 are 480, 240, 120 and 60 Hz, the later being twice the frame rate, and the rates are, respectively, 525, 262.5, 131.75 and 65.625. The frequency and rate of the clock pulses applied to counter 188 are 960 Hz and 1050, respectively.

As indicated previously, vertical retrace is for 45 lines out of a total of 525 lines and thus, with interlace, half of this every 262.5 lines. Allowing one unit of time for each of the sixteen (16) gating signals and 1.5 units of time for retrace, the ratio of lines and time allotments comes out equal. This gives fifteen (15) lines per scan for each of the sixteen (16) signals and 22.5 lines for retrace (15 × 16 = 240 then × 2 = 480); in order to obtain the 1.5 count, it is necessary to count three (3) pulses at twice the frequency. Thus, square wave vertical oscillator 204 has an output frequency of 3,840 Hz and rate of 4200. Divider 206 divides the 3840 Hz output frequency of oscillator 204 by two to provide 1920 Hz which is applied to preset count 3-counter 208. The terminal count output of counter 188 indicates the position of the last count in the 1 to 16 sequence, this being a "1" signal. Counter 208 responds to a negative-going signal edge at its preset input and thus is preset at the end of the TC signal from counter 188. Gate 210 responds to this change and blocks the second divide-by-two (2) function of divider 206; divider 206 further divides the 1920 Hz divided output from oscillator 204 to provide the 960 Hz clock pulses for counter 188 and thus, blocking the second dividing function of divider 206 blocks the input to counter 188 to interrupt the counting.

The output of gate 210, inverted by inverter 212, is applied to counter 208 and permits counter 208 to count three 1920 Hz pulses from the first dividing function of divider 206. The output of inverter 212 is also applied to decoder 198 to hold all of the outputs thereof at the "1" level. This prevents the "0" level output from occurring during vertical retrace; counter 208 having its outputs all at "0" level would otherwise give a "0" level signal at the zero (0) output of counter 188. To avoid this false condition, the "TC" output of counter 188 is inverted by inverter 214 (FIG. 12B), differentiated and applied to decoder 198 to prevent the false pulse at output zero (0) allowed by the time delay in the response of counter 208 and gate 210. counter The next three (3) 1920 Hz pulses applied to counter 208 by divider 206 causes counter 208 to cycle, the cycle being four (4), i.e., the preset pulse plus three (3) pulses. When counter 208 counts-out, the output of gate 210 is reestablished, counter 208 is blocked by the output from gate 210 inverted by inverter 212, the block is removed from divider 206 which resumes counting for its 960 rate output. It should be noted that the counting by counter 206 to divide the 4200 rate output of oscillator 204 by two (2) to provide the 2100 rate, 1920 Hz frequency output to ounter 208 is continuous, counter 206 being blocked by the output from gate 210 only to inhibit its second divide by two (2) function which provides its 960 rate output to counter 188. It will be observed that the count by counter 208 of three (3) of the 2100 rate pulses provided by counter 206 to accommodate vertical retrace is the close equivalent of the 855 count by counter 126 of the 598,500 rate timing pulses produced by horizontal oscillator 98 in the horizontal scanning system.

The 3840 Hz output frequency of square wave oscillator 204 is divided by two (2) by counter 206 in order to give absolute reliability of a symmetrical square wave, the division giving a symmetry that is dependent only on the period of the output of oscillator 204. Vertical synchronization is obtained by superimposing the vertical synchronizing signal from sync. separator 144 (FIG. 7) on the combined trigger and threshold terminals of oscillator 204.

Position generator 216 is a voltage-controlled square wave generator which, in common with position generator 156 of the horizontal scanning system, varies its frequency output from f to 2f to f in response to a square law voltage generated by scan generator 218 comprising transistors 220, 222, 224, 226, 228, 230 and 232, amplifier 234, and the associated circuitry shown in FIG. 12A. The control voltage provided by scan generator 218 is increased in accordance with the square law and then decreased in the same fashion, as shown in FIG. 8, in response to a vertical gating signal and the next successive vertical gating signal obtained from the $Q_0$ output of counter 188, the retrace gate signal from gate 210 inverted by inverter 212, and the $\overline{Q}_2$ output signal of counter 206.

The output of position generator 216 is formed by pulse former 236 comprising gates 238-1, 238-2 and 238-3 and inverters 240-1 through 240-5, the pulse width being obtained again being dependent upon the accumulated propagation delay of inverters 240-1 through 240-5 which must be an odd number. The output of pulse former 236 is inverted by inverters 242-1, 242-2 which respectively pulse-modulate the gating signals applied to gates 200-1 through 8 and 200-9 through 16.

To summarize the operation of the vertical scanning system, vertical oscillator 204 generates 3840 Hz timing pulses which are divided by two (2) for symmetry to provide 1920 Hz pulses, which are divided again by counter 206 to provide 960 Hz clock pulses which are counted by counter 188. In this connection, it will be recalled that 525 (lines) − 45 (vertical retrace) = 480 then × 2 = 960. It is necessary to count pulses equal to twice the number of lines to be scanned in order to accommodate the 22½ vertical retrace lines in each one-half frame.

Counter 188 programs decoder 198 sequentially to provide the sixteen (16) gating signals at 480 Hz. At the completion of a 960 count by counter 188, i.e., the completion of the generation of sixteen (16) successive gate signals, counter 208 is preset and the second divide by two (2) function of counter 206 is blocked by gate 210 so that the application of clock pulses to counter 188 is interrupted. The next three (3) 1920 Hz pulses from divider 206 are counted by counter 208 to accommodate the vertical retrace time, following which the second divide by two (2) function of divider 206 is re-enabled so that counter 188 resumes counting.

Scan generator 218, synchronized with the successive gating signals, generates the square law voltages for controlling oscillator 216 to generate display pulses increasing from 3.5 Mhz to 7.0 Mhz during odd numbered alternate gating signals and decreasing from 7.0 Mhz to 3.5 Mhz during the even numbered alternate gating pulses. Pulse former 236 forms the requisite $10^{-8}$ second pulses which are pulse-modulated on the gating signals by pulse modulator 202, the resulting narrow display pulses and the gating signals being successively applied to line drivers 32, 34 for each of the eight (8) line sections 20V.

One video amplifier 186 can be used to supply the video signal to all of the repeater amplifiers 42, 44 (FIGS. 7 and 10) for both the horizontal and vertical scanning systems since, in the scanning sequence, only one repeating amplifier in each scanning system will be active at any given time. Alternatively, a separate video amplifier may be employed for each of the horizontal and vertical scanning systems.

In the above-referred to specific embodiment for an 18-inch by 24-inch electroluminescent panel, the following components and component values were employed:

| Components and Component Values | |
|---|---|
| Hybrid Transformers 48 | |
| core | Ferroxcube 1041-TO60-303 |
| coil (3-bifilar) | each 6 Turns No. 31 insulated wire |
| coil (2-bifilar) | each 10 Turns No. 31 insulated wire |
| Counter 94 | F93S16DC |
| Oscillator 98 | SN74S124N |
| Gates 100 | SN74S20N |
| Inverters 106–112 | SN74S04N |
| Gates 114 | SN74S02N |
| Gate 115 | SN74S08N |
| Counter 118 | SN7473N |
| Gates 120, 124, 128 | SN74LS27N |
| Counters 125, 138, 140 | SN74197N |
| Counters 130, 134 | SN74197N |
| Gates 136, 142 | SN74S133N |
| Gates 148 | SN7402N |
| Gates 150 | SN7425N |
| Inverter 152 | SN74S04N |
| Amplifier 154 | SN72741N |
| Generator 156 | SN74S124N |
| Transistors 160, 164, 166 | MPSA20 |
| Transistors 162, 172 | MPSA70 |
| FET's 168, 170 | 3N128 |
| Amplifier 174 | CA3130 |
| Inverter 176 | SN74S04N |
| Gates 180 | SN74S02N |
| Inverters 182 | SN74S04N |
| Inverters 184 | SN74S04N |
| Counter 188 | F93S16PC |
| Gate 189 | SN7402N |
| Counter 198 | SN74154N |
| Gates 200 | SN74S02N |
| Oscillator 204 | LM555CM |
| Counter 206 | SN7474N |
| Counter 208 | SN7474N |
| Gate 210 | SN74S02N |
| Inverters 212, 213, 214 | SN74S04N |
| Generator 216 | SN74S124N |
| Transistors 220, 224, 226 | MPSA20 |
| Transistors 222, 232 | MPSA70 |
| FET's 228, 230 | 3N128 |
| Amplifier 234 | CA3130 |
| Gates 238 | SN74S02N |
| Inverters 240, 242 | SN74S04N |
| Capacitor 244 | 20 mfd. |
| Capacitor 246 | .047 mfd. |
| Resistor 248 | 5.6 K |
| Resistor 250 | 3.9 K |
| Resistor 252, 254 | 1.2 K |
| Resistors 256, 258 | 3.3 K |
| Capacitors 260 | 3.3 mfd. |
| Capacitor 262 | 39 pf. |
| Resistor 264 | 33 K |
| Resistor 266 | 270 K |
| Resistor 268 | 13 K |
| Resistor 270 | 15 K |
| Resistor 272 | 6.8 K |
| Resistor 274 | 15 K |
| Resistor 278 | 10 K |
| Capacitor 280 | |
| Diode 282 | IN4148 |
| Resistor 284 | 39 K |
| Resistor 286 | 10 |
| Resistor 288 | 270 K |
| Capacitor 291 | 200 pf. |
| Resistor 292 | 25 K Variable |
| Capacitor 294 | 470 pf. |
| Capacitor 296 | 50 pf. |
| Resistor 298 | 10 K |
| Capacitor 300 | 20 pf. |
| Resistor 302 | 27 K |
| Resistor 304 | 10 K |
| Resistor 306 | 16 K |
| Resistor 308 | 10 K |
| Resistor 310 | 39 K |
| Resistor 314 | 33 K |
| Capacitor 316 | 200 pf. |
| Resistors 318 | 680 ohms |
| Resistor 320 | 3.9 K |
| Resistor 322 | 2.7 K |
| Resistor 324 | 1.8 K |
| Resistors 326, 328 | 1 K Variable |

-continued

| Components and Component Values | |
|---|---|
| Resistor 330 | 1 K |
| Resistor 332 | 150 ohms |
| Resistors 334 | 470 ohms |
| Capacitor 336 | 50 mfd. |
| Capacitors 338 | .1 mfd |
| Capacitor 340 | 100 pf. |
| Resistor 342 | 1 K |
| Resistor 344 | 2.2 K |
| Capacitor 346 | 1 mfd. |
| Resistor 348 | 10 K |
| Resistor 350 | 8.2 K |
| Resistor 352 | 6.8 K |
| Resistor 354 | 3.3 K |
| Resistor 356 | 33 K |
| Resistor 358 | 270 K |
| Resistor 360 | 25 K Variable |
| Capacitor 362 | 10 mfd. |
| Resistors 364 | 100 ohms |
| Resistor 366 | 10 K |
| Capacitors 368 | 3.3 mfd. |
| Resistors 370 | 3.3 ohms |
| Resistors 372 | 5.6 K |
| Capacitor 374 | 620 pf. |
| Resistors 376 | 3.3 K |
| Resistors 378 | 5.6 K |
| Capacitors 380 | .047 mfd. |
| Capacitors 382 | 30 mfd. |
| Inverters 384 | SN74S04N |
| Resistor 386 | 3.9 K |
| Resistor 388 | 2.2 K |
| Capacitor 390, 392 | 1000 pf. |
| Resistors 394 | 2.2 K |
| Inverters 396, 398 | SN74S04N |
| Resistor 400 | 10 K |
| Resistor 402 | 2.2 K |
| Resistor 406 | 3.9 K |
| Capacitor 408 | 200 pf. |
| Resistors 410 | 47 ohms |
| Diodes 412 | IN4448 |
| Transistors 413 | MRF5176 |
| Resistors 414 | 10 ohms |
| Transistors 415 | SD-1341 |
| Capacitors 416 | .1 mfd. |
| Resistors 417 | 56 ohms |
| Resistors 418 | 100 ohms |
| Resistors 419 | 200 ohms |
| Capacitors 420 | 470 pf. |
| Resistors 422 | 39 ohms |
| Resistors 424 | 1 K |
| Capacitors 426 | 20 pf. |
| Resistors 428 | 470 ohms |
| Capacitors 430 | 2700 pf. |
| Diodes 432 | FH 1100 |
| Resistors 434 | 270 ohms |
| Capacitors 436 | 20 pf. |
| Resistors 438 | 1500 ohms |
| Capacitors 440 | 20 mfd. |
| Capacitor 442 | .047 mfd. |
| Resistor 444 | 5.6 K |
| Resistor 446 | 3300 ohms |
| Resistor 448 | 1200 ohms |
| Resistor 450 | 3.3 ohms |
| Capacitors 452 | 3.3 mfd. |
| Capacitors 454 | 39 pf. |
| Resistors 456 | 7500 ohms |
| Resistors 458 | 5000 ohms Variable |
| Resistors 460 | 2700 ohms |
| Capacitor 462 | .1 mfd. |
| Resistors 464 | 330 ohms |
| Resistors 466 | 10 ohms |
| Capacitor 468 | .001 mfd. |
| Resistors 470 | 160 K |
| Resistors 472 | 1000 ohms |
| Resistors 474 | 12 K |
| Resistors 476 | 33 K |
| Resistors 478 | 12 K |
| Capacitor 480 | 1200 pf. |
| Resistors 482 | 27 K |
| Resistors 484 | 10 K |
| Resistors 486 | 270 K |
| Resistors 488 | 25 K Variable |
| Resistors 490 | 27 K |
| Resistors 492 | 10 K |
| Resistors 494 | 12 K |
| Resistors 496 | 6800 ohms |
| Resistors 498 | 15 K |
| Resistors 500 | 27 K |
| Resistors 502 | 10 ohms |
| Capacitors 504 | .1 mfd. |
| Capacitors 506 | 50 pf. |
| Resistors 508 | 10 K |
| Resistors 510 | 39 K |

-continued

| Components and Component Values | |
|---|---|
| Resistors 512 | 10 ohms |
| Resistors 514 | 33 K |
| Capacitor 516 | .047 mfd. |
| Resistors 518 | 1000 ohms Variable |
| Resistors 520 | 10 K |
| Capacitor 522 | 20 pf. |
| Resistors 524 | 16 K |
| Resistors 526 | 1800 ohms |
| Resistors 528 | 1000 ohms Variable |
| Resistors 530 | 2700 ohms |
| Resistors 532 | 2200 ohms |
| Resistors 534 | 1000 ohms |
| Resistors 536 | 3900 ohms |
| Resistors 538 | 1000 ohms |
| Resistors 540 | 680 ohms |
| Capacitor 542 | .01 mfd. |
| Resistors 544 | 150 ohms |
| Resistors 546 | 470 ohms |
| Capacitors 548 | .1 mfd. |
| Capacitors 549 | 30 mfd. |
| Capacitors 550 | 50 mfd. |
| Capacitors 552 | .022 mfd. |
| Resistors 554 | 2.2 K |
| Resistors 556 | 3900 ohms |
| Resistors 558 | 2200 ohms |
| Capacitors 560 | .03 mfd. |
| Capacitors 562 | 100 pf. |
| Resistors 564 | 1 K |
| Resistors 566 | 1.2 K |
| Transistor 568 | MJE223 |
| Transistor 570 | MJE233 |
| Transistors 572(3) | MM3735 |
| Transistor 574 | 2N2904A |
| Transistor 576 | MM4008 |
| Resistor 578 | 100 K |
| Resistor 580 | 1200 ohms |
| Resistor 582 | 56 ohms |
| Resistor 584 | 47 K |
| Resistor 586 | 4300 ohms |
| Capacitor 588 | 3.3 mfd. |
| Capacitor 590 | 47 pf. |

While there have been described above the principles of this invention in connection with specific apparatus, it is to be clearly understood that this description is made only by way of example and not as a limitation to the scope of the invention.

What is claimed is:

1. In a display system including a panel having electroluminescent properties, and scanning apparatus for exciting selected areas of said panel to cause luminescence thereof, the improvement in said scanning apparatus comprising: an elongated conductor having opposite ends; conductive means spaced from said conductor and forming a transmission line therewith, said panel being disposed between said conductor and conductive means and insulated therefrom; means for generating a train of variable rate, narrow signal pulses; means coupling said generating means to one end of said line for applying said narrow pulses thereto whereby said pulses are propagated along said line toward the other end thereof, said other end of said line being adapted to reflect non-inverted pulses back toward said one end; means for varying the repetition rate of said pulses between f and 2f where f is such that a reflected pulse and the next successive applied pulse coincide at said one line end whereby the points of coincidence of said reflected and applied pulses are moved between said one line end and a point midway between said ends, the amplitudes of said reflected and applied pulses adding at said coincidence points thereby exciting areas of said panel between said conductor and conductive means.

2. The system of claim 1 wherein said conductor is folded upon itself at least once intermediate said ends to define spaced, parallel, straight leg portions.

3. The system of claim 1 wherein said conductor comprises first and second parts of substantially equal length, a first end of said line being at one end of said first part and the second end of said line being at one end of said second part; and further comprising means for coupling the other ends of said parts in series; first amplifier means coupled to said one end of said first line part, and second amplifier means coupled to said one end of said second part, each of said amplifier means including means for converting the same from a non-inverting reflecting amplifier state to a driving amplifier state in response to a gating signal; and means for generating a train of gating signals of predetermined duration and repetition rate; said varying means including means for increasing the repetition rate of said narrow pulses from f to 2f in response to one said gating signal and for decreasing the rate from 2f to f in response to the next successive gating signal, said first amplifier means being in its driving state and having said applying means coupled thereto in response to said one gating signal with said second amplifier means being in its reflective state whereby said one line end is said one end of said first line part and said coincidence points are moved from said one end to said other end of said first line part during said first gating signal, said second amplifier means being in its driving state and having said applying means coupled thereto in response to said next gating signal with said first amplifier being in its reflective state whereby said one line end is said one end of said second line part and said coincidence points are moved from said other end to said one end of said second line part during said next gating signal.

4. The system of claim 3 wherein said narrow pulses respectively have a duration not in excess of approximately $20 \times 10^{-9}$ second and f equals approximately 3.5 Mhz.

5. The system of claim 3 wherein said coupling means comprises repeater amplifier means for restoring the level of said narrow pulses propagated and reflected along said line.

6. The system of claim 5 wherein said repeater amplifier means includes means for varying the amplitude of said propagated and reflected narrow pulses in accordance with information to be displayed.

7. The system of claim 3 wherein there are a plurality of transmission line sections of substantially equal length each comprising said first and second line parts, each said section having said first and second amplifier means and said coupling means; and further comprising switching means for sequentially coupling said first and second amplifier means to each said section to said gating signal generating means and to said applying means in response to successive gate signals whereby said coincident points are moved along the entire length of transmission line comprising all of said sections.

8. The system of claim 7 wherein the conductor comprising each of said parts is folded upon itself a plurality of times intermediate its ends to define a plurality of spaced, parallel, straight leg portions.

9. The system of claim 8 wherein there are eight of said sections.

10. The system of claim 8 wherein said coupling means for each of said sections comprises a pair of repeater amplifiers respectively arranged to restore the level of the propagated and reflected pulses, said repeater amplifiers including means for varying the amplitude of said propagated and reflected pulses in accordance with a video signal; and further comprising means for separating synchronizing signals from a composite video signal; means for generating clock pulses of predetermined frequency and including means for synchronizing the same with said synchronizing signals; said gating signal generating means comprising means for counting said clock pulses and for deriving each said gating signal during the occurrence of a predetermined number of said clock pulses.

11. The system of claim 10 wherein said narrow pulse generating means comprises oscillator means including means for varying the frequency thereof in response to a control voltage, said repetition rate-varying means comprising means for generating a control voltage which increases in accordance with a square law in response to a said one gating signal and decreases in accordance with a square law in response to a said next gating signal, and means for coupling said counting means to said voltage generating means for applying said gating signals thereto.

12. The system of claim 11 wherein there are eight of said sections; and further comprising means for detecting completion of the derivation of each successive group of sixteen of said gating signals; and means for inhibiting operation of said counting means in response to said detecting means for a period of time equal to the duration of three additional said gating signals thereby to accommodate retrace time.

13. The system of claim 11 wherein there are eight of said sections and said counting means includes four output circuits respectively providing four output pulse trains respectively having repetition rates which are equal to, one-half, one-quarter, and one-eighth that of said gating signals, said switching means including means for deriving sixteen said gating signals in succession from said four pulse trains and for applying the same in succession to said first and second amplifier means of said sections.

14. The system of claim 13 further comprising means for detecting completion of the derivation of each successive group of said sixteen gating signals, and means for inhibiting operation of said counting means in response to said detecting means for a predetermined number of said clock pulses thereby to accommodate retrace time.

15. The system of claim 14 wherein the frequency of said clock pulse generating means is an integral of the frequency of said gating signals plus said last-named predetermined number.

16. The system of claim 15 wherein said integral is two, and further comprising means for dividing the frequency output of said clock pulse generating means by two.

17. The system of claim 15 wherein said integral is four, and further comprising means for dividing the frequency output of said clock pulse generating means by four.

18. The system of claim 13 wherein said switching means includes a first-plurality of sixteen gate means each coupled to said four output circuits of said counting means for providing said sixteen gating signals in sequence, each of said first and second amplifier means having a gating signal input circuit coupled to the output circuit of the respective gate means and having a pulse input circuit, said pulse applying means comprising means coupled to said oscillator means for forming said narrow pulses; and further comprising a second plurality of sixteen gating means each coupled to said pulse forming means and to the output circuit of a respective one of said first plurality of gating means for modulating said gating pulses in response to said narrow pulses and having its output circuit coupled to the pulse input circuit of the respective first and second amplifier means.

19. The system of claim 1 wherein said varying means varies said repetition rate over a predetermined time interval.

20. The system of claim 19 further comprising a second elongated conductor having opposite ends and extending substantially perpendicular to said first-named conductor thereby to define at least one cross-over point therewith, said second conductor forming a second transmission line with said conductive means, said second conductor being disposed between said panel and said conductive means and insulated therefrom; means for generating a second train of variable rate narrow signal pulses; second means coupling said second pulse generating means to one end of said second line for applying said second pulses thereto whereby said second pulses are propaged along said second line toward the other end thereof, said other end of said second line being adapted to reflect non-inverted pulses toward said one end thereof; second means for varying the repetition rate of said second pulses between f and 2f over a second predetermined time interval so related to said first-mentioned time interval that the points of pulse coincidence on said transmission lines coincide at said cross-over point, said narrow pulse on said lines being polarized so that the coincident pulses add at said cross-over point thereby to excite said panel to luminescence.

21. The system of claim 20 wherein each of said conductors is folded upon itself a plurality of times intermediate its ends to define a plurality of spaced, parallel, straight leg portions, the leg portions of one said conductor being substantially perpendicular to the leg portions of the other conductor and defining a plurality of cross-over points therewith, said time intervals being so related that the respective coincidence points move along one line from said one end to the midpoint thereof while the respective coincidence points move along that part of one leg portion of the other line which defines cross-over points with said one line thereby to scan the luminescent points on said panel along said leg portion of said other line.

22. The system of claim 21 wherein each said conductor comprises first and second parts of substantially equal length, a first end of each said line being at one end of the respective first part and the second end being at one end of the respective second part; and further comprising means for coupling the other ends of said parts of each line in series; first amplifier means coupled to said one end of the first part of each line, and second amplifier means coupled to said one end of the second part of each line, each of said amplifier means including means for converting the same from a non-inverting reflecting amplifier state to a driving amplifier state in response to a gating signal; means for generating a first train of gating signals, said first-mentioned time interval being the duration of each said first gating signals, and means for generating a second train of gating signals, said second time interval being the duration of each said second gating signal; said pulse rate varying means respectively including means for increasing the repetition rate of said first-mentioned and second pulses from f to 2f in response to one respective gate signal and for decreasing the rate from 2f to f in response to the next successive respective gate signal, each first amplifier means being in its driving state and having the respective pulse applying means coupled thereto in response to a respective one gating signal with the respective second amplifier means being in its reflective state whereby the respective one line end is the one end of the respective first line part and the coincidence points are moved from said one end to said other end of the respective first line part during the respective one gating signal, each second amplifier means being in its driving state and having the respective pulse applying means coupled thereto in response to the respective next gating signal with the respective first amplifier means being in its reflective state whereby the respective one line end is the one end of the respective second line part and the coincidence points are moved from said other end to said one end of the respective second line part during the respective next gating signal, the duration of said gating signals being such that the respective coincidence points move along one line from said one end thereof to the other while the respective coincicence points move along one leg portion of the other line.

23. The system of claim 22 wherein each said line comprises eight sections each having said first and second line parts, each said section of each line having said first and second amplifier means and line part coupling means; and further comprising first switching means for sequentially coupling the respective first and second amplifier means of each section of said first-mentioned line to said first gating signal generating means and to said first-named pulse applying means in response to sixteen successive first gating signals whereby the coincident points on said first line are moved along the entire length thereof comprising all of said eight sections, and second switching means for sequentially coupling the respective first and second amplifier means of each section of said second line to said second gating signal generating means and to said second pulse applying means in response to sixteen successive second gating signals whereby the coincidence points on said second line are moved along the entire length thereof comprising all eight sections.

24. The system of claim 23 wherein each of said line part coupling means comprises repeater amplifier means having means for varying the amplitude of the propagated and reflected pulses in accordance with a video signal.

25. The system of claim 24 further comprising means for separating horizontal and vertical synchronizing signals from a composite video signal; means for generating first clock pulses of predetermined frequency and including means for synchronizing the same with said horizontal synchronizing signals; said first gating signal generating means comprising means for counting said first clock pulses and for deriving each said first gating signal during the occurrence of a predetermined number of said first clock pulses; means for generating second clock pulses of predetermined frequency and including means for synchronizing the same with said vertical synchronizing signals; said second gating signal generating means comprising means for counting said second clock pulses and for deriving each said second gating signal during the occurrence of a predetermined number of said second clock pulses; each said narrow pulse generator means comprising oscillator means including means for varying the frequency thereof in response to a control voltage, each said repetition rate varying means comprising means for generating a control voltage which increases in response to a respective said one gating signal and decreases in response to a respective said next gating signal; means for respectively coupling said first and second counting means to the voltage generating means of said first named and second pulse generating means for respectively applying said gating signals thereto; first means for detecting completion of the derivation of each successive group of sixteen first gating signals, and means for inhibiting operation of said first counting means in response to said first detecting means for a first predetermined number of said first clock pulses thereby to accommodate line retrace time; means for detecting completion of the derivation of a number of successive said groups of said first gating signals corresponding to the number of leg portions of said second line, and means for inhibiting operation of said first counting means in response to said second detecting means for a second predetermined number of said first clock pulses thereby to accommodate frame retrace time; and third means for detecting completion of the derivation of each successive group of sixteen second gating signals, and means for inhibiting operation of said second counting means in response to said third actuating means for a predetermined number of said second clock pulses thereby to accommodate frame retrace time.

26. The system of claim 25 wherein each of said counting means includes four output circuits respectively providing four output pulse trains respectively having repetition rates which are equal to, one-half, one-quarter, and one-eighth that of the respective gating signals, the repetition rate of the lowest frequency output pulse trains of said first and second counting means respectively being the line and twice the frame synchronizing rates of said composite video signal; each said switching means including means for deriving said sixteen gating signals in succession from said four pulse trains and for applying the same in succession to the respective first and second amplifier means.

27. The system of claim 26 wherein said first line comprises 960 leg portions and said second line comprises 480 leg portions.

28. The system of claim 27 wherein the line synchronizing rate is 15,750 hz and the frame synchronizing rate is 30 hz, said first predetermined number of first clock pulses being 3, said second predetermined number of first clock pulses being 855, said predetermined number of second clock pulses being 3; the frequency of said first clock pulse generating means being 598,500 hz, means for dividing the frequency output of said first clock pulse generating means by two, and means for dividing the frequency output of said second clock pulse generating means by four; said narrow pulses respectively having a duration not in excess of approximately $10^{-8}$ second, f being approximately 3.5 Mhz.

29. The method of causing luminescence of selected areas of a panel having electroluminescent properties, said panel having an elongated conductor on one side thereof and conductive means on the other side, said conductor having opposite ends and defining a transmission line with said conductive means, said method comprising the steps of: applying a train of narrow pulses to one end of said line whereby said pulses are propagated along said line toward the other end thereof; reflecting said pulses in non-inverted form at said other end of said line whereby the reflected pulses are propagated back along said line toward said one end thereof; and varying the repetition rate of said pulses between f and 2f where f is such that a reflected pulse and the next successive applied pulse coincide at said one line end whereby the points of coincidence of said reflected and applied pulses are moved between said one line and a point midway between said ends, the aplitudes of said reflected and applied pulses adding at said coincidence points thereby exciting areas of said panel between said conductor and conductive means.

30. The method of claim 29 wherein the repetition rate of said pulses is increased from f to 2f thereby moving said coincidence points from said one line end to said midpoint, and comprising the further step of applying said pulses to said other line end and decreasing said repetition rate from 2f to f thereby moving said coincidence points from said midpoint to said other line end.

31. The method of claim 30 wherein said repetition rate is increased and decreased, respectively, in accordance with a square law.

32. The method of claim 29 wherein said pulses have a duration not in excess of about $10^{-8}$ second and f is about 3.5 Mhz.

33. The method of claim 29 comprising the further step of varying the amplitude of at least one of said applied and reflected pulses in accordance with information to be displayed on said panel.

34. The method of claim 29 wherein said line comprises first and second parts of substantially equal length each having first and second ends, first and second amplifying means respectively coupled to said first ends of said line parts and each being convertible from a non-inverting reflecting amplifier to a driving amplifier in response to a gating signal of predetermined duration, and means coupling said second ends of said line parts in series; comprising the further steps of applying a first gating signal to said first amplifier means, applying said pulse train to said first amplifier means and increasing the repetition rate thereof from f to 2f during said first gating signal whereby said coincidence points are moved from said first end to said second end of said first line part during said first gating signal; applying a second gating signal to said second amplifier means, applying said pulse train to said second amplifier means and decreasing the repetition rate thereof from 2f to f during said second gating signal whereby said coincidence points are moved from said second end to said first end of said second line part during said second gating signal.

35. The method of claim 34 wherein there are a plurality of line sections each comprising said first and second parts and said first and second amplifier means and coupling means; comprising the further steps of sequentially applying said first and second gating signals and pulse train to said first and second amplifier means of each section whereby said coincidence points are moved along the total length of line comprising all of said sections.

36. The method of claim 35 comprising the further steps of providing a train of clock pulses; counting said clock pulses to provide a said gating signal in response to a first predetermined number of clock pulses; detecting completion of application of said gating signals to all of said line sections; and inhibiting said counting for a second predetermined number of pulses thereby to accommodate retrace time.

37. The method of claim 29 wherein there is a second elongated conductor having opposite ends on one side of said panel and forming a second transmission line with said conductive means, said second conductor extending substantially perpendicular to said first conductor and defining a cross-over point therewith; comprising the further steps of varying the repetition rate of said first-mentioned pulse train over a first predetermined time interval; applying a second train of narrow pulses to one end of said second line whereby said pulses are propagated along said second line toward the other end thereof; reflecting said second pulses in non-inverted form at said other end of said second line whereby said reflected second pulses are propagated back along said second line toward said one end thereof; varying the repetition of said second pulses between f and 2f over a second predetermined time interval whereby the points of coincidence of said reflected and applied pulses are moved between said one end of said second line and the midpoint thereof, the amplitudes of said reflected and applied second pulses adding at said coincidence points thereby exciting areas of said panel aligned with said second conductor and conductive means; and controlling the relationship between said first and second time intervals so that said coincidence points on said first-named and second lines coincide at said cross-over point, said coincident pulses being additive thereby exciting said panel to luminescence at said coincidence point.

38. The method of claim 37 wherein each of said lines is folded upon itself at a plurality of points intermediate its length to define a plurality of spaced, parallel, leg portions, the leg portions of said first-named line being substantially perpendicular to the leg portions of said second line and respectively defining a plurality of cross-over points therewith; comprising the further steps of increasing the repetition rates of said first and second pulses from f to 2f during the respective first and second time intervals; and controlling the relationship between said time intervals so that said coincident points on said first line move from said one end to said midpoint thereof while said coincident points on said second line move from said one end thereof along one leg portion thereof which defines cross-over points with the leg portions of said first line between said one end and midpoint thereof.

39. The method of claim 38 further comprising varying the amplitude of at least one of the applied and reflected first pulse and of at least one of the applied and second pulses in accordance with a video signal.

* * * * *